United States Patent
Qin et al.

(10) Patent No.: US 11,445,484 B2
(45) Date of Patent: Sep. 13, 2022

(54) COMMUNICATION METHOD, RELATED DEVICE, AND COMPUTER STORAGE MEDIUM

(71) Applicant: Huawei Technologies Co., Ltd., Shenzhen (CN)

(72) Inventors: Yi Qin, Kista (SE); Zhongfeng Li, Munich (DE); Hao Tang, Shanghai (CN); Fan Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 320 days.

(21) Appl. No.: 16/541,653

(22) Filed: Aug. 15, 2019

(65) Prior Publication Data
US 2019/0373602 A1    Dec. 5, 2019

Related U.S. Application Data

(63) Continuation of application No. PCT/CN2018/091653, filed on Jun. 15, 2018.

(30) Foreign Application Priority Data

Jun. 16, 2017  (CN) .......................... 201710459790.3

(51) Int. Cl.
*H04W 72/04* (2009.01)
*H04L 5/00* (2006.01)

(52) U.S. Cl.
CPC ....... *H04W 72/0413* (2013.01); *H04L 5/0023* (2013.01); *H04L 5/0051* (2013.01)

(58) Field of Classification Search
None
See application file for complete search history.

(56) References Cited

U.S. PATENT DOCUMENTS

2010/0002649 A1   1/2010  Teo et al.
2013/0286994 A1*  10/2013 Liu ............... H04L 5/0051
                                               370/329
(Continued)

FOREIGN PATENT DOCUMENTS

CN    101969337 A    2/2011
CN    102412889 A    4/2012
(Continued)

OTHER PUBLICATIONS

"Beam management across multiple carriers," 3GPP TSG RAN WG1 Meeting #89, Hangzhou, China, R1-1706928, XP051261585, pp. 1-6, 3rd Generation Partnership Project, Valbonne, France (May 15-19, 2017).

(Continued)

*Primary Examiner* — Shripal K Khajuria
(74) *Attorney, Agent, or Firm* — Leydig, Voit & Mayer, Ltd.

(57) ABSTRACT

A method, device, and storage medium are disclosed that determine beam information of an antenna port for a frequency domain resource not used for transmitting uplink data and/or uplink control information. In one embodiment, a first device determines, based on first configuration information, that a beam for sending a first uplink reference signal on a first antenna port is also a beam for sending a second uplink reference signal on a second antenna port, and sends the first uplink reference signal on the first antenna port. Beam information of the first antenna port can be determined based on beam information of the second antenna port, and the first uplink reference signal can be sent based on the determined beam information of the first antenna port. This can spare beam configuration performed by a network side for the first frequency domain resource, (Continued)

and reduce overheads for transmitting configuration information.

19 Claims, 13 Drawing Sheets

(56) References Cited

U.S. PATENT DOCUMENTS

| | | |
|---|---|---|
| 2016/0344464 A1 | 11/2016 | Kim |
| 2017/0126382 A1 | 5/2017 | Chung et al. |
| 2017/0353931 A1 | 12/2017 | Stern-Berkowitz et al. |
| 2018/0054797 A1* | 2/2018 | Islam ............... H04W 72/042 |
| 2019/0103951 A1* | 4/2019 | Park ................. H04L 1/0061 |
| 2019/0288807 A1* | 9/2019 | Zhang ............... H04B 7/0456 |

FOREIGN PATENT DOCUMENTS

| | | |
|---|---|---|
| CN | 102595514 A | 7/2012 |
| CN | 103069739 A | 4/2013 |
| CN | 103945447 A | 7/2014 |
| CN | 104106223 A | 10/2014 |
| CN | 104247291 A | 12/2014 |
| CN | 104426830 A | 3/2015 |
| CN | 106664192 A | 5/2017 |
| CN | 106850023 A | 6/2017 |
| CN | 104081846 B | 3/2018 |
| CN | 104969650 B | 8/2019 |
| WO | 2013042982 A1 | 3/2013 |
| WO | 2014049496 A1 | 4/2014 |
| WO | 2015047002 A1 | 4/2015 |

OTHER PUBLICATIONS

Zhang Xiaodan et al., "Analysis of Core Technologies of LTE System and Discussion of eNodeB Test Scheme," Telecom Network Technology, Issue 12, total 9 pages (2009). With English abstract.

ZTE, ZTE Microelectronics, "Discussion on DL beam management," 3GPP TSG RAN WG1 Meeting #88bis, Spokane, USA, R1-1704398, total 12 pages, 3rd Generation Partnership Project, Valbonne, France (Apr. 3-7, 2017).

ZTE, ZTE Microelectronics, "Beam related indication for beam management," 3GPP TSG RAN WG1 Meeting #88, Athens, Greece, R1-1701799, total 5 pages, 3rd Generation Partnership Project, Valbonne, France (Feb. 13-17, 2017).

* cited by examiner

COMMUNICATION METHOD, RELATED DEVICE, AND COMPUTER STORAGE MEDIUM

CROSS-REFERENCE TO RELATED APPLICATIONS

This application is a continuation of International Application No. PCT/CN2018/091653, filed on Jun. 15, 2018, which claims priority to Chinese Patent Application No. 201710459790.3, filed on Jun. 16, 2017. The disclosures of the aforementioned applications are hereby incorporated by reference in their entireties.

TECHNICAL FIELD

Embodiments of this application relate to the communications field, and in particular, to a communication method, a related device, and a computer storage medium.

BACKGROUND

Among wireless communications systems, for example, long term evolution (LTE), LTE-Advanced, or new radio (NR), in a time division duplex (TDD) system, uplink channel information needs to be obtained to perform uplink scheduling. A terminal device sends a sounding reference signal (SRS) to a base station, and the base station performs uplink channel measurement based on the SRS, to obtain uplink channel information. In addition, the base station needs to obtain downlink channel information for downlink scheduling. In the TDD system, an uplink and a downlink use one frequency channel, and channel characteristics of the uplink and the downlink are consistent. This is referred to as channel reciprocity. In a solution for obtaining downlink channel information, with antennas calibrated, a base station exploits channel reciprocity to perform a transpose operation on an uplink channel information matrix obtained through uplink SRS measurement, to obtain a downlink channel information matrix for downlink scheduling. This provides higher accuracy as compared to a solution in which a terminal device measures and feeds back downlink channel information based on a downlink SRS.

In a wireless communications system, a user's bandwidth capacity for uplink transmission may be different from the user's bandwidth capacity for downlink reception. Therefore, a quantity of component carriers (CC) of the user for uplink transmission is possibly different from a quantity of CCs of the user for downlink transmission. Generally, a quantity of CCs in frequency domain resources for transmitting a physical uplink control channel and/or a physical uplink shared channel is possibly less than a quantity of CCs in frequency domain resources for transmitting a physical downlink control channel and/or a physical downlink shared channel. Therefore, there may be some CCs that are not used for transmitting a physical uplink control channel and/or a physical uplink shared channel. For channel reciprocity—based channel estimation for a CC not used for transmitting a physical uplink control channel and/or a physical uplink shared channel, an uplink SRS may be transmitted on the CC not used for transmitting a physical uplink control channel and/or a physical uplink shared channel, and then a downlink channel status of the CC not used for transmitting a physical uplink control channel and/or a physical uplink shared channel is determined based on the SRS and channel reciprocity.

As wireless communications systems develop, the concept of beam is introduced to the wireless communications systems. In view of this, a communication solution is urgently needed to determine beam information of an antenna port for a frequency domain resource not used for transmitting uplink data and/or uplink control information.

SUMMARY

Embodiments of this application provide a communication method, a related device, and a computer storage medium, to determine beam information of an antenna port for a frequency domain resource not used for transmitting uplink data and/or uplink control information.

According to a first aspect, an embodiment of this application provides a communication method. The method includes: receiving, by a first device, first configuration information on a second frequency domain resource, where the first configuration information is used to indicate a first resource for the first device to send a first uplink reference signal on a first frequency domain resource and a second resource for the first device to send a second uplink reference signal on the second frequency domain resource; the first frequency domain resource is not used for transmitting uplink data and/or uplink control information; and the first uplink reference signal is used for uplink channel sounding, and the second uplink reference signal is used for uplink channel sounding; determining, by the first device based on the first configuration information, that a QCL relationship is present between the first antenna port for the first uplink reference signal and a second antenna port for the second uplink reference signal; and sending, by the first device, the first uplink reference signal on the first antenna port, where the sending is based on the QCL relationship between the first antenna port and the second antenna port. In other words, beam information of the first antenna port can be determined based on beam information of the second antenna port, and then the first uplink reference signal can be sent based on the determined beam information of the first antenna port. This can spare network-side beam configuration for the first frequency domain resource, and reduce overheads for transmitting configuration information.

In a possible design, the first configuration information is carried in one piece of downlink control information, and the determining, by the first device based on the first configuration information, that a QCL relationship is present between a first antenna port for the first reference signal and a second antenna port for the second reference signal includes: determining, by the first device, that the one piece of downlink control information (DCI) is used to instruct the first device to send the first uplink reference signal on the first frequency domain resource and to send the second uplink reference signal on the second frequency domain resource, so as to determine that a QCL relationship is present between the first antenna port for the first uplink reference signal and the second antenna port for the second uplink reference signal. In this solution, when one piece of DCI triggers a plurality of reference signals, a network side can configure a transmit beam for only one of the reference signals, thereby reducing overheads for configuration of transmit beams.

In a possible design, the determining, by the first device based on the first configuration information, that a QCL relationship is present between a first antenna port for the first uplink reference signal and a second antenna port for the second uplink reference signal includes: determining, by the first device, that the first resource for the first device to send the first uplink reference signal on the first frequency domain resource and the second resource for the first device to send the second uplink reference signal on the second frequency domain resource belong to one uplink reference signal resource set or one uplink reference signal resource configuration, so as to determine that a QCL relationship is present between the first antenna port for the first uplink reference signal and the second antenna port for the second uplink reference signal. In this solution, for the one uplink reference signal resource configuration or the one uplink reference signal resource set, the network side can configure a transmit beam for only one of the reference signals, thereby reducing overheads for configuration of transmit beams.

In a possible design, in an optional solution in this embodiment, if the first frequency domain resource and the second frequency domain resource meet at least one of the following conditions, the first resource and the second resource belong to one uplink reference signal resource set or one uplink reference signal resource configuration. These conditions may be: the first frequency domain resource and the second frequency domain resource have a same subcarrier spacing; the first frequency domain resource and the second frequency domain resource have a same cyclic prefix; the first frequency domain resource and the second frequency domain resource have a same timing advance; a frequency domain gap between the first frequency domain resource and the second frequency domain resource is less than a threshold, where the frequency domain gap may be a gap between central frequencies of the first frequency domain resource and the second frequency domain resource, or a gap between a lowest frequency of the first frequency resource and a highest frequency of the second frequency resource, or a gap between a lowest frequency of the second frequency resource and a highest frequency of the first frequency resource. Optionally, the at least one condition may further include: the first frequency domain resource and the second frequency domain resource are within one frequency domain range. In this case, it can be considered that the two frequency resources are similar in beam performance. For example, if the first frequency resource and the second frequency resource are a first CC and a second CC respectively, and the two CCs are within one CC group or one frequency band, the first frequency resource and the second frequency resource are considered to meet the condition. For another example, if the first frequency resource and the second frequency resource are a first bandwidth part and a second bandwidth part respectively, and the two bandwidth parts are within one CC, one bandwidth part group, or one frequency band, the first frequency resource and the second frequency resource are considered to meet the condition. The frequency band may be an operation band.

In a possible design, the first uplink reference signal is in a correspondence with the second uplink reference signal. Optionally, the correspondence between the first uplink reference signal and the second uplink reference signal may be configured by the network side, or predefined, or learned of by the first device in advance.

In a possible design, the first frequency domain resource is a first component carrier, and the second frequency domain resource is a second component carrier. In a possible design, the first frequency domain resource is a first bandwidth part, and a second frequency domain resource is a second bandwidth part.

According to a second aspect, an embodiment of this application provides a communication method. The method includes: receiving, by a first device, first configuration information on a second frequency domain resource, where the first configuration information is used to indicate a resource for the first device to send a first uplink reference signal on a first frequency domain resource; the first frequency domain resource is not used for transmitting uplink data and/or uplink control information; the first uplink reference signal is used for uplink channel sounding; and the first frequency domain resource is further used for the first device to receive a third downlink reference signal; determining, by the first device, that a QCL relationship is present between the first antenna port for the first uplink reference signal and a third antenna port for the third downlink reference signal; and sending, by the first device, the first uplink reference signal on the first antenna port, where the sending is based on the presence of the QCL relationship between the first antenna port for the first uplink reference signal and the third antenna port for the third downlink reference signal. In other words, beam information of the first antenna port can be determined based on beam information of the third antenna port, and then the first uplink reference signal can be sent based on the determined beam information of the first antenna port. This can spare network-side beam configuration for the first frequency domain resource, and reduce overheads for transmitting configuration information.

According to a third aspect, an embodiment of this application provides a communication method. The method may be used alone or may be used in combination with the first aspect or the second aspect. The method includes: determining, by a first device, that a time interval between a first uplink reference signal and a third uplink reference signal is not less than a threshold, or determining that first configuration information is further used to indicate a resource for the third uplink reference signal, where the first configuration information is one piece of DCI or one MAC CE message, or determining that a first resource for sending the first uplink reference signal and a third resource for sending the third uplink reference signal belong to one uplink reference signal resource set or one uplink reference signal resource configuration; and transmitting, by the first device, uplink control information and/or uplink data on a time domain resource between the first uplink reference signal and the third uplink reference signal, where the third uplink reference signal is the 1st uplink reference signal used for uplink channel sounding following the first uplink reference signal, and the first configuration information is further used to instruct the first device to send the third uplink reference signal on a third frequency domain resource, where the third uplink reference signal is used for uplink channel sounding. In this way, uplink transmission is performed between the first uplink reference signal and the third uplink reference signal only when these two uplink reference signals meet a condition. This ensures reasonable switching and can reduce a waste of time between the two uplink reference signals.

In a possible design, the threshold meets at least one of the following: the threshold is not less than twice a radio frequency retuning time. In this way, the first device can have sufficient time to complete frequency band switching twice for a radio frequency device between the first reference signal and the second reference signal, so that the third reference signal can be sent successfully.

In a possible design, the threshold is not less than a sum of twice the radio frequency retuning time and a length of k time units, where k is a number not less than 0, and the time unit is a slot or a symbol. In this way, the first device can have sufficient time to complete frequency band switching twice for a radio frequency device between the first reference signal and the second reference signal, so that the third reference signal can be sent successfully. In addition, the first device can have time to transmit uplink control information and/or uplink data after the first switching.

In a possible design, the threshold is not less than a sum of twice the radio frequency retuning time, the length of the k time units, and a preset offset, where the offset is less than a length of one symbol. In this way, uplink control information and/or uplink data of an integer number of time units can be transmitted between the first uplink reference signal and the third uplink reference signal. Therefore, time domain resources between the first uplink reference signal and the third uplink reference signal can be effectively utilized.

In a possible design, the first frequency domain resource is also the third frequency domain resource.

According to a fourth aspect, an embodiment of this application provides a communication method. The method may be used alone or may be used in combination with any one or more of the first aspect, the second aspect, and the third aspect. The method includes: determining, by a first device, a maximum radio frequency retuning time based on a carrier frequency for communication of the first device or a reference subcarrier spacing for communication of the first device; and reporting, by the first device, information indicating the radio frequency retuning time of the first device, where the radio frequency retuning time reported by the first device is not greater than the maximum radio frequency retuning time. In this way, a network side can have more accurate knowledge about the radio frequency retuning time of the first device. In addition, for a wide frequency band range, the radio frequency retuning time of the first device varies with the carrier frequency or the reference subcarrier spacing. In this embodiment of this application, the maximum radio frequency retuning time is determined based on the carrier frequency or the reference subcarrier spacing, and in turn, the radio frequency retuning time of the first device is determined more accurately.

In a possible design, the information indicating the radio frequency retuning time of the first device may be an index of the radio frequency retuning time of the first device. For example, some indexes may be predefined to indicate different radio frequency retuning times. The first device reports an index of a radio frequency retuning time, and a network device can determine the radio frequency retuning time based on the index of the radio frequency retuning time. The index of the radio frequency retuning time may directly be the radio frequency retuning time, or may be an identifier that can indicate the radio frequency retuning time. Alternatively, the information indicating the radio frequency retuning time of the first device may be an index indicating a quantity of symbols corresponding to the radio frequency retuning time of the first device, where a subcarrier spacing corresponding to the symbols is the reference subcarrier spacing. For example, some indexes may be predefined to indicate quantities of symbols corresponding to different radio frequency retuning times. The first device reports an index of a quantity of symbols corresponding to a radio frequency retuning time, and the network device can determine the quantity of symbols based on the index of the quantity of symbols corresponding to the radio frequency retuning time, and further determine the radio frequency retuning time based on the quantity of symbols. The index of the quantity of symbols corresponding to the radio frequency retuning time may directly be the quantity of symbols corresponding to the radio frequency retuning time, or may be an identifier that can indicate the quantity of symbols corresponding to the radio frequency retuning time.

In a possible design, a quantity of bits occupied by the information indicating the radio frequency retuning time of the first device is determined by the maximum radio frequency retuning time. This can ensure a constant precision of quantification.

In a possible design, the reference subcarrier spacing may be preset, or may be determined based on a factor such as a carrier frequency. For example, the reference subcarrier spacing may be one of subcarrier spacings of frequency domain resources configured for communication of the first device, for example, a subcarrier spacing of a frequency domain resource capable of transmitting uplink control information and/or uplink data. Alternatively, the reference subcarrier spacing may be a largest value of all subcarrier spacings of frequency domain resources configured for communication of the first device. In this way, accuracy of the reported radio frequency retuning time can be improved. Alternatively, the reference subcarrier spacing may be a smallest value of all subcarrier spacings of frequency domain resources configured for communication of the first device. Alternatively, the reference subcarrier spacing may be a subcarrier spacing that is in a correspondence with the carrier frequency for communication of the first device, for example, preconfigured by the network side, learned of by the first device in advance, or specified in a protocol. Alternatively, the reference subcarrier spacing may be a largest value of subcarrier spacings that are in a correspondence with the carrier frequency for communication of the first device. Alternatively, the reference subcarrier spacing may be a smallest value of subcarrier spacings that are in a correspondence with the carrier frequency for communication of the first device. Alternatively, the reference subcarrier spacing may be a subcarrier spacing that is predefined as a reference subcarrier spacing, for example, predefined in a protocol or through negotiation between the first device and a second device. Alternatively, the reference subcarrier spacing may be a subcarrier spacing that is configured as a reference subcarrier spacing, for example, preconfigured by the network side.

According to a fifth aspect, an embodiment of this application provides a communication method. The method includes: sending, by a second device, first configuration information on a second frequency domain resource, where the first configuration information is used to indicate a first resource for a first device to send a first uplink reference signal on a first frequency domain resource and a second resource for the first device to send a second uplink reference signal on the second frequency domain resource; the first frequency domain resource is not used for transmitting uplink data and/or uplink control information; the first uplink reference signal is used for uplink channel sounding, and the second uplink reference signal is used for uplink channel sounding; and a quasi co-location (QCL) relationship is present between a first antenna port for the first uplink reference signal and a second antenna port for the second uplink reference signal; and receiving, by the second device, the first uplink reference signal, where the receiving is based on the QCL relationship between the first antenna port and the second antenna port. In other words, beam information of the first antenna port can be determined based on beam information of the second antenna port, and then the first uplink reference signal can be sent based on the determined beam information of the first antenna port. This can spare network-side beam configuration for the first frequency domain resource, and reduce overheads for transmitting configuration information. Optionally, the first uplink reference signal is received on the first antenna port.

Optionally, that a quasi co-location (QCL) relationship is present between a first antenna port for the first uplink reference signal and a second antenna port for the second uplink reference signal may include:

the first configuration information is carried in one piece of downlink control information or one MAC CE message; or the first resource for sending the first uplink reference signal on the first frequency domain resource and the second resource for sending the second uplink reference signal on the second frequency domain resource belong to one uplink reference signal resource set or one uplink reference signal resource configuration.

For introductions about the first frequency domain resource and the second frequency domain resource, refer to the content in the first aspect. No more details are described herein. In a possible design, the first frequency domain resource is a first component carrier, and the second frequency domain resource is a second component carrier. In a possible design, the first frequency domain resource is a first bandwidth part, and a second frequency domain resource is a second bandwidth part.

According to a sixth aspect, an embodiment of this application provides a communication method. The method includes: sending, by a second device, first configuration information on a second frequency domain resource, where the first configuration information is used to indicate a resource for the first device to send a first uplink reference signal on a first frequency domain resource; the first frequency domain resource is not used for transmitting uplink data and/or uplink control information; the first uplink reference signal is used for uplink channel sounding; the first frequency domain resource is further used for the first device to receive a third downlink reference signal; and a QCL relationship is present between the first antenna port for the first uplink reference signal and a third antenna port for the third downlink reference signal; and receiving, by the second device, where the receiving is based on the presence of the QCL relationship between the first antenna port for the first uplink reference signal and the third antenna port for the third downlink reference signal. In other words, beam information of the first antenna port can be determined based on beam information of the third antenna port, and then the first uplink reference signal can be sent based on the determined beam information of the first antenna port. This can spare network-side beam configuration for the first frequency domain resource, and reduce overheads for transmitting configuration information. Optionally, the first uplink reference signal is received on the first antenna port.

According to a seventh aspect, an embodiment of this application provides a communication method. The method may be used alone or may be used in combination with the fifth aspect or the sixth aspect. In this method, first configuration information is further used to instruct a first device to send a third uplink reference signal on a third frequency domain resource, where the third uplink reference signal is used for uplink channel sounding. The method further includes: receiving, by a second device, uplink control information and/or uplink data transmitted by the first device on a time domain resource between the first uplink reference signal and the third uplink reference signal, where the third uplink reference signal is the 1st uplink reference signal used for uplink channel sounding following the first uplink reference signal, and the uplink control information and/or uplink data is transmitted by the first device when the first device determines that a time interval between the first uplink reference signal and the third uplink reference signal is not less than a threshold, or determines that the first configuration information is further used to indicate a resource for the third uplink reference signal, and that the first configuration information is one piece of downlink control information (DCI) or one MAC CE message, or determines that a first resource for sending the first uplink reference signal and a third resource for sending the third uplink reference signal belong to one uplink reference signal resource set or one uplink reference signal resource configuration. In this way, uplink transmission is performed between the first uplink reference signal and the third uplink reference signal only when these two uplink reference signals meet a condition. This ensures reasonable switching and can reduce a waste of time between the two uplink reference signals.

For introductions about the threshold, refer to the content in the third aspect. No more details are described herein.

In a possible design, the first frequency domain resource is also the third frequency domain resource.

According to an eighth aspect, an embodiment of this application provides a communication method. The method may be used alone or may be used in combination with any one or more of the fifth aspect, the sixth aspect, and the seventh aspect. The method includes: receiving, by a second device, information reported by a first device for indicating a radio frequency retuning time of the first device, where the radio frequency retuning time reported by the first device is not greater than a maximum radio frequency retuning time, and the maximum radio frequency retuning time is determined by the first device based on a carrier frequency for communication of the first device or a reference subcarrier spacing for communication of the first device. In this way, a network side can have more accurate knowledge about the radio frequency retuning time of the first device. In addition, for a wide frequency band range, the radio frequency retuning time of the first device varies with the carrier frequency or the reference subcarrier spacing. In this embodiment of this application, the maximum radio frequency retuning time is determined based on the carrier frequency or the reference subcarrier spacing, and in turn, the radio frequency retuning time of the first device is determined more accurately.

For introductions about the information indicating the radio frequency retuning time of the first device, refer to the content in the fourth aspect. No more details are described herein.

In a possible design, a quantity of bits occupied by the information indicating the radio frequency retuning time of the first device is determined by the maximum radio frequency retuning time. This can ensure a constant precision of quantification.

Corresponding to the communication method in the first aspect to the fourth aspect, this application further provides a communications device. The communications device may be any transmit-end device or receive-end device performing data transmission in a wireless manner, for example, a communications chip, a terminal device, or a network device (for example, a base station). In a communication process, a transmit-end device is opposite to a receive-end device. In some communication processes, the communications device may act as the foregoing first device. In some communication processes, the communications device may act as the foregoing second device. For example, for downlink data transmission, a transmit-end device is a base station, and a corresponding receive-end device is a terminal device; for uplink data transmission, a transmit-end device is a terminal device, and a corresponding receive-end device is a base station; and for D2D (device-to-device) data communication, a transmit-end device is UE, and a corresponding receive-end device may also be UE. A communication manner is not limited in this application.

The first device may be a terminal device or a communications chip usable in a terminal device, and the second device may be a network device or a communications chip usable in a network device.

According to a ninth aspect, a communications device is provided, and includes a sending unit and a receiving unit to execute the method according to any possible implementation of the first aspect to the fourth aspect, or the communications device is configured to execute the method according to any possible implementation of the fifth aspect to the eighth aspect. The sending unit is configured to perform functions related to sending, and the receiving unit is configured to perform functions related to receiving.

In a design, the communications device is a communications chip. The sending unit may be an input circuit or interface of the communications chip, and the sending unit may be an output circuit or interface of the communications chip.

In another design, the communications device is a terminal device, and the sending unit may be a transmitter or a transmitter device.

In another design, the communications device is a network device, and the sending unit may be a receiver or an input port.

Optionally, the communications device may further include various modules configured to perform the communication method according to any possible implementation of the first aspect to the fourth aspect. Alternatively, optionally, the communications device may further include various modules configured to perform the communication method according to any possible implementation of the fifth aspect to the eighth aspect.

According to a tenth aspect, a communications device is provided, including a processor and a memory. The memory is configured to store a computer program. The processor is configured to invoke the computer program from the memory and run the computer program, so that the communications device executes the method according to any possible implementation of the first aspect to the fourth aspect, or the communications device is configured to execute the method according to any possible implementation of the fifth aspect to the eighth aspect.

Optionally, there may be one or more processors, and one or more memories.

Optionally, the memory and the processor may be integrated together, or the memory and the processor are disposed separately.

Optionally, the communications device further includes a transmitter (transmit port) and a receiver (input port).

In a possible design, a terminal device is provided, including a transceiver, a processor, and a memory. The processor is configured to control the transceiver to send and receive signals. The memory is configured to store a computer program. The processor is configured to invoke the computer program from the memory and run the computer program, so that the terminal device executes the method according to any possible implementation of the first aspect to the fourth aspect.

In another possible design, a network device is provided, including a transceiver, a processor, and a memory. The processor is configured to control the transceiver to send and receive signals. The memory is configured to store a computer program. The processor is configured to invoke the computer program from the memory and run the computer program, so that the network device executes the method according to any possible implementation of the fifth aspect to the eighth aspect.

According to an eleventh aspect, a system is provided, and the system includes the foregoing terminal device and network device.

According to a twelfth aspect, a computer program product is provided, where the computer program product includes a computer program (which may also be referred to as code or an instruction). When the computer program is run, a computer is enabled to perform the method according to any possible implementation of the first aspect to the fourth aspect or the method according to any possible implementation of the fifth aspect to the eighth aspect.

According to a thirteenth aspect, a computer-readable medium is provided, where the computer-readable medium stores a computer program (which may also be referred to as code or an instruction). When the computer program is run on a computer, the computer is enabled to perform the method according to any possible implementation of the first aspect to the fourth aspect or the method according to any possible implementation of the fifth aspect to the eighth aspect.

DESCRIPTION OF EMBODIMENTS

Figure 1:
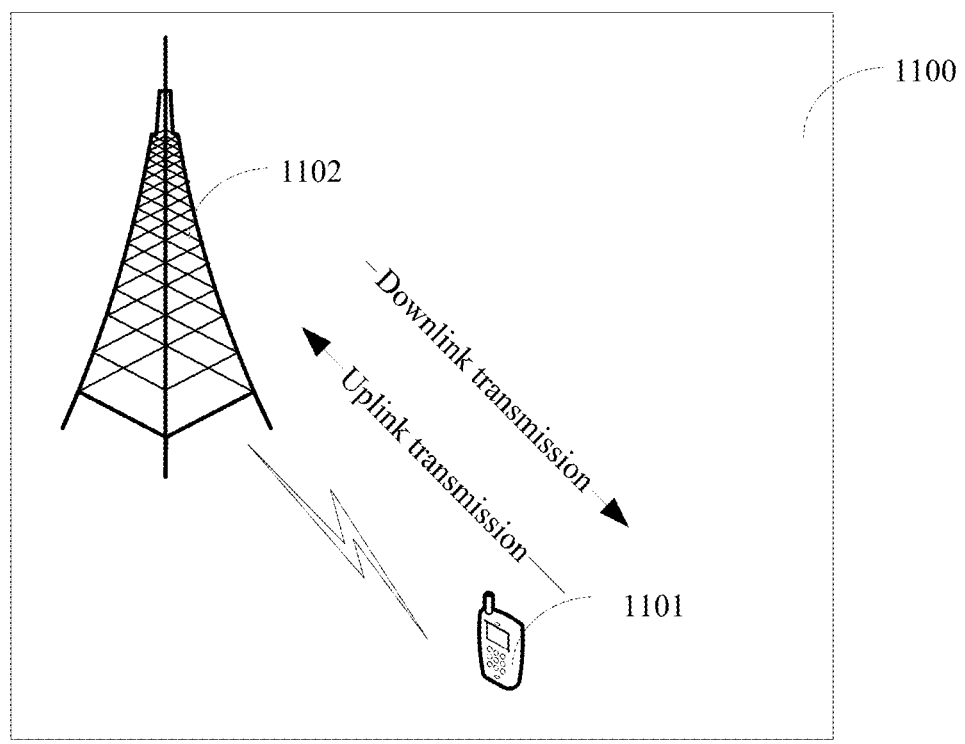
FIG. 1 is a schematic architecture diagram of a communications system according to an embodiment of this application.

FIG. 1 is a schematic architecture diagram of a communications system to which the embodiments of this application are applied. As shown in FIG. 1, the communications system 1100 may include a first device 1101 and a second device 1102 that are connected in a wireless manner, a wired manner, or other manners. There may be a plurality of first devices in the embodiments of this application. FIG. 1 shows only one as an example.

The first device 1101 may communicate with one or more core networks through a radio access network (RAN). The first device may be a terminal device or a chip that can be disposed in a terminal device. The terminal device in the embodiments of this application may be a mobile phone, a tablet computer (pad), a computer with a wireless sending/receiving function, a virtual reality (VR) terminal device, customer-premises equipment (CPE), an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. The embodiments of this application are not limited to a specific application scenario.

The second device 1102 may be a device configured to communicate with the first device, and may be any device with a wireless sending/receiving function or a chip that can be disposed in a device. The device includes but is not limited to a base station (for example, a NodeB, an evolved NodeB (eNodeB), a network device in a fifth-generation (5G) communications system (for example, a transmission point (TP), a transmission reception point (TRP), a base station, or a micro base station device), a network device in a future communications system, an access node in a Wi-Fi system, a wireless relay node, and a wireless backhaul node.

In the embodiments of this application, information transmitted by the first device to the second device is referred to as uplink transmission information, and information transmitted by the second device to the first device is referred to as downlink transmission information.

A frequency domain resource in the embodiments of this application may be a component carrier (CC), or may be a serving cell in LTE. The "serving cell" is a cell in communication with the first device, where the communication herein indicates a state of communication, and it does not mean that a communication action certainly occurs. In an optional implementation, a first frequency domain resource is a first component carrier, and a second frequency domain resource is a second component carrier.

The frequency domain resource in the embodiments of this application may be a bandwidth part (band partial, BP). Each BP is a consecutive segment of frequency domain resources, and one BP may be corresponding to one sub-carrier spacing and one cyclic prefix (CP). In an optional implementation, the first frequency domain resource is a first bandwidth part, and the second frequency domain resource is a second bandwidth part.

In the embodiments of this application, an uplink reference signal may be an SRS, a physical random access channel (PRACH), or a demodulation reference signal (DMRS), and a downlink reference signal may be a channel state information reference signal (CSI-RS) or a DMRS.

The term "and/or" in the embodiments of this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Embodiment 1

In view of the foregoing, an embodiment of this application provides a possible implementation solution. The solution may be implemented alone or may be used in combination with other embodiments provided in this application. The communications solution can be applied in an application scenario with uplink beamforming (UL beamforming) introduced, for example, in an NR system with uplink beamforming introduced. In this scenario, with the communications solution provided in this embodiment of this application, beam information of a first antenna port for a first uplink reference signal on a first frequency domain resource can be determined based on beam information of a second antenna port for a second uplink reference signal on a second frequency domain resource. Therefore, this solution can reduce an amount of beam information of frequency domain resources that needs to be configured by a network side, and reduce overheads for transmitting configuration information. In an LTE system, beam information of a frequency domain resource can be configured by using radio resource control (RRC) signaling. In an NR system, beam information of a frequency domain resource can be configured by using a media access control (MAC) control element (MAC CE) or downlink control information (DCI), or can be configured by using RRC signaling.

A beam may be understood as a spatial resource, and may refer to a transmit or receive precoding vector with energy transmission directivity. In addition, the transmit or receive precoding vector can be identified by using index information. The energy transmission directivity may mean that with a given range of spatial locations, a signal that is precoded by using the precoding vector is received with a relatively good received power, for example, with a satisfactory received demodulation signal-to-noise ratio. The energy transmission directivity may also mean that, by using the precoding vector, identical signals sent from different spatial locations are received with different received powers.

Optionally, one communications device (such as a terminal device or a network device) may have different precoding vectors, and different devices may also have different precoding vectors, that is, correspond to different beams.

According to a configuration or capability of the communications device, one communications device may use one or more of different precoding vectors at a same time, that is, one or more beams may be formed at a same time. Beam information may be identified by using index information. Optionally, the index information may correspond to a resource identity (ID) configured for UE. For example, the index information may correspond to an ID or a resource configured for a channel state information reference signal (CSI-RS), or an ID or a resource configured for a sounding reference signal (SRS). Alternatively, optionally, the index information may be a signal carried by a beam or index information explicitly or implicitly carried by a channel. For example, the index information may be a synchronization signal sent by using a beam or index information of the beam as indicated by a broadcast channel.

A beam pair may include a transmit-end transmit beam and a receive-end receive beam, which are also referred to as an uplink beam or a downlink beam. For example, the beam pair may include a gNB Tx beam transmit beam or a UE Rx beam receive beam. Alternatively, the beam pair may include a UE Tx beam transmit beam or a gNB Rx beam receive beam. The transmit beam may also be understood as a transmit beam.

A beam may be identified by at least one of the following:

1. Logical number. One logical number may correspond to one dynamically changing transmit and receive beam pair. It may be a reduced mapping of CSI-RS resource numbers/antenna port numbers. For example, a base station may have totally used many CSI-RS resources or antenna ports, but CSI-RS resources or antenna ports measured and used by one UE are only a subset thereof. Therefore, a reduced manner as compared to direct indication of CSI-RS resources/antenna ports may be used to indicate CSI-RSs previously used by the UE, so as to indicate a receive beam of the UE.

2. Beam pair link (BPL) number. This is an indicator used to indicate a transmit and receive beam pair.

3. CSI-RS resource number/antenna port number. This indicates a previously used/measured CSI-RS resource number/antenna port number, to notify UE of a receive beam to be used for reception.

4. SS block time index. SS means synchronization signal. An SS block time index is an index of a time at which UE receives an SS block, and may be used to notify the UE of a receive beam to be used for reception.

Figure 2:
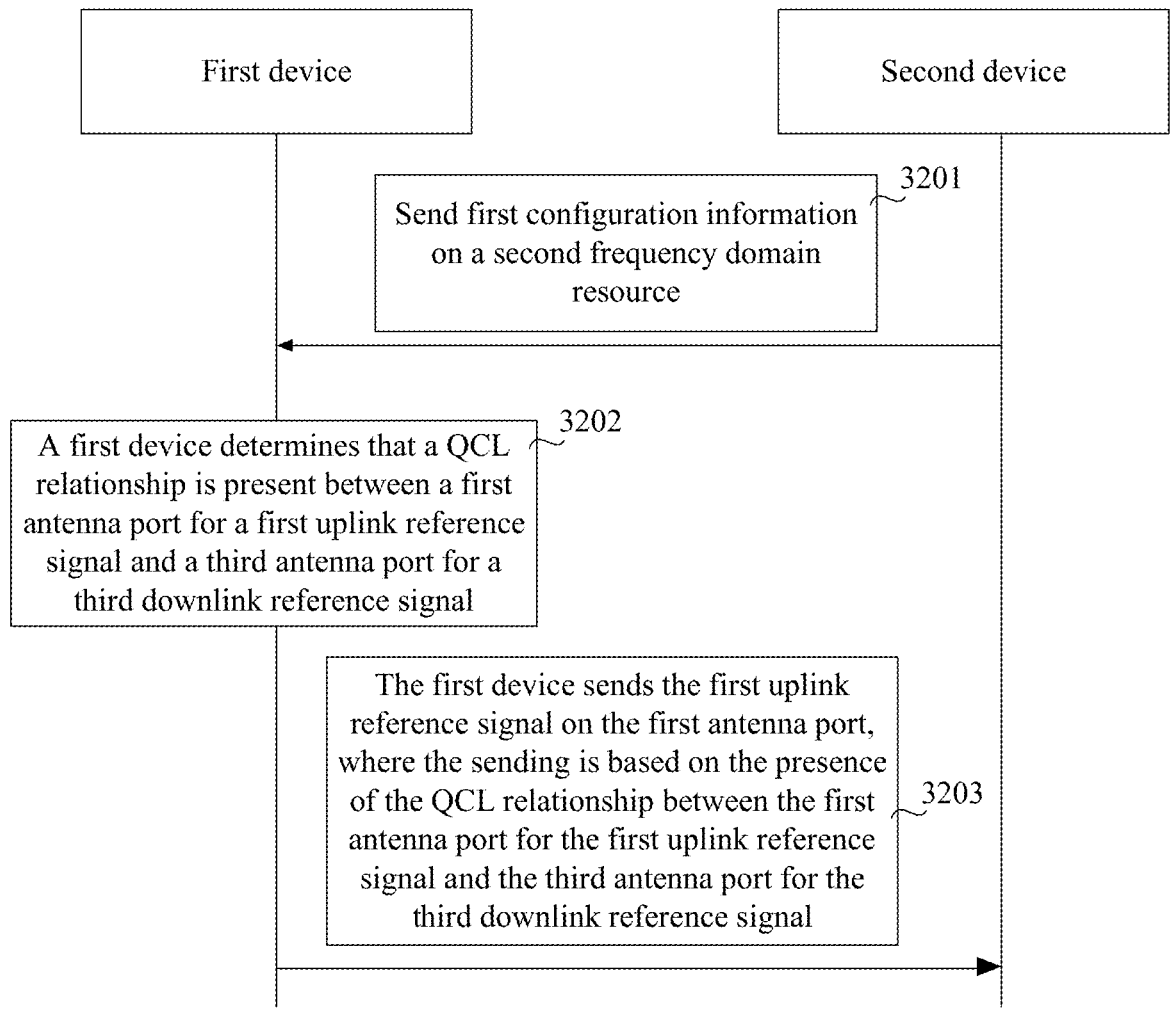
FIG. 2 is a schematic flowchart of a communication method according to an embodiment of this application.

FIG. 2 illustratively shows a schematic flowchart of a communication method according to an embodiment of this application. As shown in FIG. 2, the method includes the following steps.

Step 3201: A first device receives first configuration information on a second frequency domain resource.

The first configuration information may be carried in RRC signaling, DCI, or a MAC CE message. The DCI may be DCI specific to a user or a user group. The first configuration information may be sent by a second device. In other words, the second device sends the first configuration information on the second frequency domain resource.

The first configuration information is used to indicate a resource for the first device to send a first uplink reference signal on a first frequency domain resource. Optionally, the first resource includes a first antenna port and/or a time-frequency-code resource for sending the first reference signal. The first frequency domain resource and the second frequency domain resource may be one frequency domain resource or two different frequency domain resources. To be specific, if the first frequency domain resource is a first component carrier and the second frequency domain resource is a second component carrier, the first component carrier and the second component carrier may be two different component carriers or one same component carrier. If the first frequency domain resource is a first bandwidth part and the second frequency domain resource is a second bandwidth part, the first bandwidth part and the second bandwidth part may be two different bandwidth parts or one same bandwidth part.

There are a plurality of manners for the first configuration information to indicate the first resource, for example, using DCI to directly indicate the first resource. For example, a specified bit in preset DCI is used to carry indication information of the first frequency domain resource and the first resource in the first configuration information. After receiving the DCI, the first device can determine that an uplink reference signal needs to be sent on the first resource of the first frequency domain resource. Alternatively, the indication information of the first frequency domain resource and the first resource may be carried in a MAC CE and/or RRC signaling, and the first configuration information may be a combination of such signaling. For example, the RRC signaling carries a plurality of groups of one or more candidates of indication information of the first frequency domain resource and the first resource, and the MAC CE or DCI indicates one of the plurality of groups of candidates.

The first frequency domain resource is not used for transmitting uplink data and/or uplink control information. The second frequency domain resource may be used for transmitting uplink data and/or uplink control information, or may not be used for transmitting uplink data and/or uplink control information. This is not limited in this embodiment of this application. Transmitting uplink data may be transmitting data from the first device to the second device, and transmitting uplink control information may be transmitting uplink control information from the first device to the second device. The uplink data and/or uplink control information may be a physical uplink control channel (PUCCH), a physical uplink shared channel (PUSCH), or other uplink information.

The first uplink reference signal is used for uplink channel sounding. After receiving the first uplink reference signal, the second device may perform uplink channel sounding on a frequency domain resource occupied by the first uplink reference signal on the first frequency domain resource, to obtain an uplink channel state of the first frequency domain resource, and may further determine a downlink channel state of the first frequency domain resource based on channel reciprocity.

The first frequency domain resource is further used for the first device to receive a third downlink reference signal. The third downlink reference signal may be a demodulation reference signal (DMRS) of a physical downlink shared channel (PDSCH), a channel state information reference signal (CSI-RS), or a DMRS of a physical downlink control channel (PDCCH).

Step 3202: The first device determines that a quasi co-location (QCL) relationship is present between a first antenna port for the first uplink reference signal and a third antenna port for the third downlink reference signal. The QCL relationship in the present disclosure may also be referred to as a spatial QCL relationship or a reciprocal spatial QCL relationship.

In other words, in the solution shown in FIG. 2, a transmit beam for an uplink reference signal is determined based on a transmit beam for a downlink reference signal on the first frequency domain resource. To be specific, a reciprocal QCL relationship is present between the first antenna port and the third antenna port. In an optional implementation solution, a reciprocal QCL relationship is present between a transmit beam on the third antenna port and a transmit beam on the first antenna port. For example, the first antenna port and the third antenna port have a same angle of arrival. Optionally, the third downlink reference signal may be a newly received PDSHC DMRS or PDCCH DMRS sent by the second device. Alternatively, the third downlink reference signal may be an optimal CSI-RS in a plurality of CSI-RSs reported within a recent period of time.

The transmit beam on the third antenna port may be configured by a network side, and there are a plurality of configuration methods. For example, the transmit beam on the third antenna port is indicated directly.

Step 3203: The first device sends the first uplink reference signal on the first antenna port, where the sending is based on the presence of the QCL relationship between the first antenna port for the first uplink reference signal and the third antenna port for the third downlink reference signal. Correspondingly, the second receives the first uplink reference signal, where the receiving is based on the presence of the QCL relationship between the first antenna port for the first uplink reference signal and the third antenna port for the third downlink reference signal. Optionally, the first uplink reference signal is received on the first antenna port.

Figure 2A:
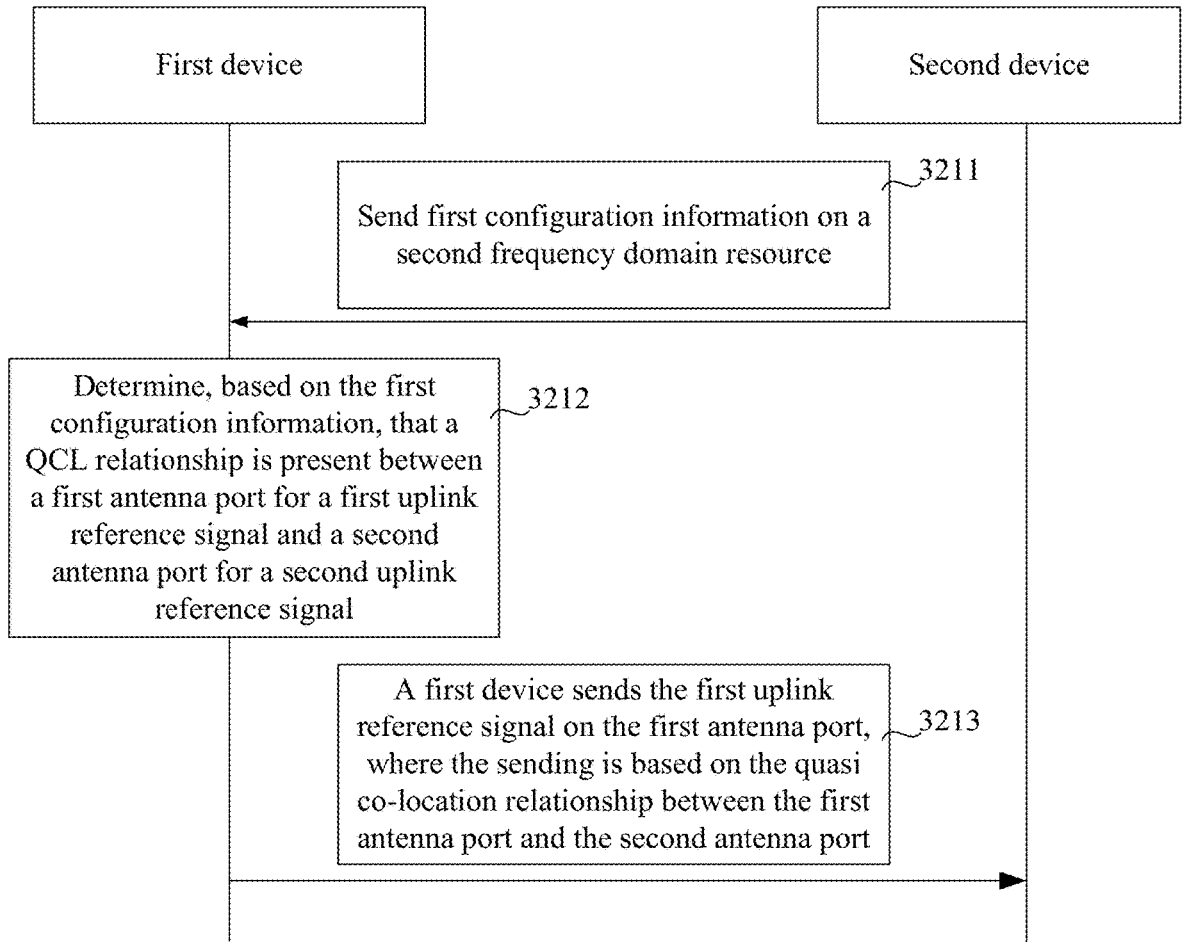
FIG. 2a is a schematic flowchart of another communication method according to an embodiment of this application.

To reduce an amount of beam information of frequency domain resources that needs to be configured by the network side, and to reduce overheads for transmitting configuration information, in addition to the solution provided in step 3201 to step 3203, FIG. 2a further illustratively shows a schematic flowchart of a communication method according to an embodiment of this application. As shown in FIG. 2a, the method includes the following steps.

Step 3211: A first device receives first configuration information on a second frequency domain resource. The first configuration information may be sent by a second device. In other words, the second device sends the first configuration information on the second frequency domain resource.

Compared with the first configuration information in step 3201, the first configuration information in 3211 is used to indicate not only a first resource for the first device to send a first uplink reference signal on a first frequency domain resource, but also a second resource for the first device to send a second uplink reference signal on the second frequency domain resource. Optionally, the second resource includes a second antenna port for sending the second reference signal, and the first resource includes a first antenna port for sending the first reference signal. The first frequency domain resource and the second frequency domain resource may be one frequency domain resource or two different frequency domain resources. To be specific, if the first frequency domain resource is a first component carrier and the second frequency domain resource is a second component carrier, the first component carrier and the second component carrier may be two different component carriers or one same component carrier. If the first frequency domain resource is a first bandwidth part and the second frequency domain resource is a second bandwidth part, the first bandwidth part and the second bandwidth part may be two different bandwidth parts or one same bandwidth part.

There are a plurality of manners for the first configuration information to indicate the first resource and the second resource, for example, using DCI to directly indicate the first resource and the second resource. For example, a specified bit in preset DCI is used to carry indication information of the first frequency domain resource and the first resource and indication information of the second frequency domain resource and the second resource in the first configuration information. After receiving the DCI, the first device can determine that a reference signal needs to be sent on the first resource of the first frequency domain resource and on the second resource of the second frequency domain resource. For another example, a plurality of groups of resources are configured by using higher layer signaling (for example, RRC signaling, or a MAC CE message), each group of resources includes one or more resources for sending reference signals, and one or more of the configured plurality of groups of resources are triggered by DCI. For example, if the first resource and the second resource are in one resource group, after a terminal device receives signaling (for example, DCI) that triggers this resource group, the terminal device sends reference signals on the two resources.

The first frequency domain resource is not used for transmitting uplink data and/or uplink control information. The second frequency domain resource may be used for transmitting uplink data and/or uplink control information, or may not be used for transmitting uplink data and/or uplink control information. This is not limited in this embodiment of this application. Transmitting uplink data may be transmitting data from the first device to the second device, and transmitting uplink control information may be transmitting uplink control information from the first device to the second device. The uplink data and/or uplink control information may be a physical uplink control channel (PUCCH), a physical uplink shared channel (PUSCH), or other uplink information.

The first uplink reference signal is used for uplink channel sounding, and the second uplink reference signal is used for uplink channel sounding. After receiving the first uplink reference signal, the second device may perform uplink channel sounding on the first frequency domain resource, to obtain an uplink channel state of the first frequency domain resource, and may further determine a downlink channel state of the first frequency domain resource based on channel reciprocity. After receiving the second uplink reference signal, the second device may perform uplink channel sounding on the second frequency domain resource, to obtain an uplink channel state of the second frequency domain resource, and, may further determine a downlink channel state of the second frequency domain resource based on channel reciprocity.

Step 3212: The first device determines, based on the first configuration information, that a QCL relationship is present between the first antenna port for the first uplink reference signal and a second antenna port for the second downlink reference signal. In other words, the first device determines, based on the first configuration information, a second antenna port that has a QCL relationship with the first antenna port, and thereby determines a transmit beam on the first antenna port based on a transmit beam on the second antenna port. In an optional solution, the transmit beam on the second antenna port is also the transmit beam on the first antenna port.

The transmit beam on the second antenna port may be configured by a network side, and there are a plurality of configuration methods. For example, the transmit beam on the second antenna port is indicated directly. For another example, the network side indicates an identifier of a resource on which a reference signal has been sent on the second frequency domain resource, for example, an identifier of a resource on which an SRS has been sent (SRS resource indicator, SRI), then the first device can use a transmit beam for sending the reference signal on the resource as the transmit beam on the second antenna port for the second frequency domain resource. For another example, based on reciprocity, a CSI-RS resource indicator (CSI-RS resource indicator, CRI) is used to indicate a downlink CSI-RS on the second frequency domain resource. The first device determines uplink transmit beam information on the second frequency domain resource based on downlink receive beam information on the CSI-RS resource on the second frequency domain resource. In another optional implementation solution, the network side may alternatively configure a transmit beam for each frequency domain resource.

Step 3213: The first device sends the first uplink reference signal on the first antenna port, where the sending is based on the quasi co-location relationship between the first antenna port and the second antenna port. Correspondingly, the second device receives the first uplink reference signal, where the receiving is based on the quasi co-location relationship between the first antenna port and the second antenna port. Optionally, the first uplink reference signal is received on the first antenna port.

There are a plurality of manners for the first device to determine, based on the first configuration information, that a QCL relationship is present between the first antenna port for the first uplink reference signal and the second antenna port for the second uplink reference signal in step 3212. The following introduces, by using an example a1 and an example a2, several possible manners for determining the second antenna port that has a QCL relationship with the first antenna port based on the first configuration information.

EXAMPLE a1

The first configuration information is carried in one piece of downlink control information, where downlink control information may be abbreviated as DCI in English. One piece of DCI is one piece of control information that is encoded and/or scrambled at one time, and different pieces of DCI are separately encoded and/or scrambled. The first device determines that the one piece of DCI is used to instruct the first device to send the first uplink reference signal on the first frequency domain resource and to send the second uplink reference signal on the second frequency domain resource, so as to determine that a QCL relationship is present between the first antenna port for the first uplink reference signal and the second antenna port for the second uplink reference signal. In other words, the first device determines one piece of DCI that carries the first configuration information instructing the first device to send the first uplink reference signal on the first frequency domain resource, and determines other frequency domain resources that are also indicated by the DCI to be used for sending uplink reference signals. Among these frequency domain resources, a frequency domain resource that has been configured with transmit beam information by the network side may serve as the second frequency domain resource. Antenna ports having a QCL relationship share a transmit beam. Therefore, it can be considered that reference signals sent on a frequency domain resource that are triggered by one piece of DCI are corresponding to one transmit beam. In this solution, when one piece of DCI triggers a plurality of reference signals, the network side can configure a transmit beam for only one of the reference signals, thereby reducing overheads for configuration of transmit beams.

In another optional implementation, the first configuration information is carried in one MAC CE message. One MAC CE message is one piece of control information that is encoded and/or scrambled at one time, and different MAC CE messages are separately encoded and/or scrambled. The first device determines that the one MAC CE message is used to instruct the first device to send the first uplink reference signal on the first frequency domain resource and to send the second uplink reference signal on the second frequency domain resource, so as to determine that a QCL relationship is present between the first antenna port for the first uplink reference signal and the second antenna port for the second uplink reference signal. In other words, the first device determines one MAC CE message that carries the first configuration information instructing the first device to send the first uplink reference signal on the first frequency domain resource, and determines other frequency domain resources that are also indicated by the MAC CE message to be used for sending uplink reference signals. Among these frequency domain resources, a frequency domain resource that has been configured transmit beam information by the network side may serve as the second frequency domain resource. Antenna ports having a QCL relationship share a transmit beam. Therefore, it can be considered that reference signals sent on a frequency domain resource that are triggered by one MAC CE message are corresponding to one transmit beam. In this solution, when one MAC CE message triggers a plurality of reference signals, the network side can configure a transmit beam for only one of the reference signals, thereby reducing overheads for configuration of transmit beams.

In a third optional implementation, the first configuration information is carried in one piece of RRC signaling. One piece of RRC signaling is one piece of control information that is encoded and/or scrambled at one time, and different pieces of RRC signaling are separately encoded and/or scrambled. The first device determines that the one piece of RRC signaling is used to instruct the first device to send the first uplink reference signal on the first frequency domain resource and to send the second uplink reference signal on the second frequency domain resource, so as to determine that a QCL relationship is present between the first antenna port for the first uplink reference signal and the second antenna port for the second uplink reference signal. In other words, the first device determines one piece of RRC signaling that carries the first configuration information instructing the first device to send the first uplink reference signal on the first frequency domain resource, and determines other frequency domain resources that are also indicated by the RRC signaling to be used for sending uplink reference signals. Among these frequency domain resources, a frequency domain resource that has been configured with beam information by the network side may serve as the second frequency domain resource. Antenna ports having a QCL relationship share a transmit beam. Therefore, it can be considered that reference signals sent on a frequency domain resource that are triggered by one piece of RRC signaling are corresponding to one transmit beam. In this solution, when one piece of RRC signaling triggers a plurality of reference signals, the network side can configure a transmit beam for only one of the reference signals, thereby reducing overheads for configuration of transmit beams.

EXAMPLE a2

This embodiment of this application may include a plurality of uplink reference signal resource configurations. In a communications system, a plurality of resources used for sending uplink reference signals may correspond to one uplink reference signal resource configuration, or a plurality of resources used for sending uplink reference signals may be indicated by one uplink reference signal resource configuration. Optionally, uplink reference signals sent on resources included in one uplink reference signal resource set or one uplink reference signal resource configuration may be triggered by one piece of DCI. Each uplink reference signal resource configuration includes resources corresponding to a plurality of uplink reference signals, and uplink reference signals on all resources included in one uplink reference signal resource configuration share a transmit beam. Therefore, a network side can configure a transmit beam for an uplink reference signal corresponding to only one resource. In other words, the first device determines that the first resource for the first device to send the first uplink reference signal on the first frequency domain resource and the second resource for the first device to send the second uplink reference signal on the second frequency domain resource belong to one uplink reference signal resource configuration, so as to determine that a QCL relationship is present between the first antenna port for the first uplink reference signal and the second antenna port for the second uplink reference signal. In this embodiment of this application, a resource for an uplink reference signal already configured with a transmit beam in the uplink reference signal resource configuration may be referred to as a second resource, and a resource for an uplink reference signal not configured with a transmit beam in the uplink reference signal resource configuration may be referred to as a first resource. In this solution, for one uplink reference signal resource configuration, the network side can configure a transmit beam for only one of the reference signals, thereby reducing overheads for configuration of transmit beams.

In another optional implementation, this embodiment of this application may include a plurality of uplink reference signal resource sets. In a communications system, a plurality of resources for sending uplink reference signals may be arranged in one group, and this group may be referred to as an uplink reference signal resource set. Optionally, uplink reference signals sent on resources included in one uplink reference signal resource set may be triggered by one piece of DCI. Each uplink reference signal resource set includes resources corresponding to a plurality of uplink reference signals, and uplink reference signals on all resources included in one uplink reference signal resource set share a transmit beam. Therefore, the network side can configure a transmit beam for an uplink reference signal corresponding to only one resource. In other words, the first device determines that the first resource for the first device to send the first uplink reference signal on the first frequency domain resource and the second resource for the first device to send the second uplink reference signal on the second frequency domain resource belong to one uplink reference signal resource set, so as to determine that a QCL relationship is present between the first antenna port for the first uplink reference signal and the second antenna port for the second uplink reference signal. In this embodiment of this application, a resource for an uplink reference signal already configured with a transmit beam in the uplink reference signal resource set may be referred to as a second resource, and a resource for an uplink reference signal not configured with a transmit beam in the uplink reference signal resource set may be referred to as a first resource. In this solution, for one uplink reference signal resource set, the network side can configure a transmit beam for only one of the reference signals, thereby reducing overheads for configuration of transmit beams.

In an optional implementation of this embodiment of this application, if the first frequency domain resource and the second frequency domain resource meet at least one of the following conditions, the first resource and the second resource belong to one uplink reference signal resource set or one uplink reference signal resource configuration. These conditions may be: the first frequency domain resource and the second frequency domain resource have a same subcarrier spacing; the first frequency domain resource and the second frequency domain resource have a same cyclic prefix; the first frequency domain resource and the second frequency domain resource have a same timing advance; a frequency domain gap between the first frequency domain resource and the second frequency domain resource is less than a threshold, where the frequency domain gap may be a gap between central frequencies of the first frequency domain resource and the second frequency domain resource, or a gap between a lowest frequency of the first frequency resource and a highest frequency of the second frequency resource, or a gap between a lowest frequency of the second frequency resource and a highest frequency of the first frequency resource. Optionally, the at least one condition may further include: the first frequency domain resource and the second frequency domain resource are within one frequency domain range. In this case, it can be considered that the two frequency resources are similar in beam performance. For example, if the first frequency resource and the second frequency resource are a first CC and a second CC respectively, and the two CCs are within one CC group or one frequency band, the first frequency resource and the second frequency resource are considered to meet the condition. For another example, if the first frequency resource and the second frequency resource are a first bandwidth part and a second bandwidth part respectively, and the two bandwidth parts are within one CC, one bandwidth part group, or one frequency band, the first frequency resource and the second frequency resource are considered to meet the condition. The frequency band may be an operation band.

In other words, frequency domain resources with a same subcarrier spacing may be grouped into one uplink reference signal resource set or one uplink reference signal resource configuration, and further, a group number may be allocated to each uplink reference signal resource set or uplink reference signal resource configuration according to an order of subcarrier spacings. Alternatively, frequency domain resources with a same CP may be grouped into one uplink reference signal resource set or one uplink reference signal resource configuration. Alternatively, frequency domain resources with a same TA may be grouped into one uplink reference signal resource set or one uplink reference signal resource configuration. Alternatively, frequency domain resources relatively close in frequency domain may be grouped into one uplink reference signal resource set or one uplink reference signal resource configuration. These conditions can ensure a relatively short frequency domain gap between frequency domain resources corresponding to resources included in one uplink reference signal resource set or one uplink reference signal resource configuration. Therefore, uplink reference signals on all resources included in one uplink reference signal resource set or one uplink reference signal resource configuration may share a transmit beam. In this way, the network side can configure a transmit beam for only one uplink reference signal, thereby reducing overheads for configuration of transmit beams.

In another optional solution, an uplink reference signal resource set or an uplink reference signal resource configuration is configured in advance. For example, the first frequency domain resource and the second frequency domain resource are configured to belong to one uplink reference signal resource set or one uplink reference signal resource configuration.

In this embodiment of this application, a plurality of uplink reference signal resource sets or uplink reference signal resource configurations can be obtained through division based on the foregoing division manners. All resources included in each uplink reference signal resource set may have a same pattern, mapping method, time/frequency domain density, sequence, transmit/receive beam (or QCL relationship), or other configuration parameters. All resources included in each uplink reference signal resource configuration may have a same pattern, mapping method, time/frequency domain density, sequence, transmit/receive beam (or QCL relationship), or other configuration parameters.

The foregoing has introduced, by using the example a1 and the example a2, several solutions for determining the second antenna port that has a QCL relationship with the first antenna port. The following introduces another solution for determining the second antenna port that has a QCL relationship with the first antenna port. If one piece of DCI triggers a plurality of first uplink reference signals that need to be sent on a first frequency domain resource, which are a first uplink reference signal 1, a first uplink reference signal 2, and a first uplink reference signal 3, this DCI also triggers a plurality of second uplink reference signals that need to be sent on a second frequency domain resource, which are a second uplink reference signal 1, a second uplink reference signal 2, a second uplink reference signal 3, and a second uplink reference signal 4. In this case, an antenna port having a QCL relationship can be determined based on a preset correspondence between reference signals. For example, the plurality of first uplink reference signals on the first frequency domain resource are in a preset one-to-one correspondence with the plurality of second uplink reference signals on the second frequency domain resource, in the foregoing order. To be specific, the first uplink reference signal 1 is in a correspondence with the second uplink reference signal 1, the first uplink reference signal 2 is in a correspondence with the second uplink reference signal 2, and the first uplink reference signal 3 is in a correspondence with the second uplink reference signal 3. An antenna port for each first uplink reference signal is in a correspondence with an antenna port for a second uplink reference signal corresponding to this first uplink reference signal. Therefore, a second antenna port that has a QCL relationship with a first antenna port for sending each first uplink reference signal is determined based on the correspondence. Optionally, the correspondence between the first uplink reference signal and the second uplink reference signal may be configured by the network side, or predefined, or learned of by the first device in advance.

Optionally, in the solution described in step 3201 to step 3203 and the solution described in step 3211 to step 3213, the QCL is spatial QCL or other types of QCL, for example, another type of QCL defined in NR.

Optionally, the QCL relationship in this embodiment means that signals corresponding to antenna ports for signals have identical parameters. Alternatively, the QCL relationship means that a terminal can determine a parameter of an antenna port that has a QCL relationship with another antenna port, based on a parameter of the another antenna port. Alternatively, the QCL relationship means that two antenna ports have identical parameters. Alternatively, the QCL relationship means that a difference between parameters of two antenna ports is less than a threshold. The parameter herein may be at least one of a delay spread, a Doppler spread, a Doppler shift, an average delay, an average gain, an angle of arrival (AOA), an average AOA, an AOA spread, an angle of departure (AOD), an average angle of departure AOD, an AOD spread, a receive antenna spatial correlation parameter, a transmit antenna spatial correlation parameter, a transmit beam, a receive beam, and a resource identity. A beam includes at least one of the following: a precoding code, a weight sequence number, and a beam sequence number. An angle may be a value decomposed in one of different dimensions, or a combination of values decomposed in different dimensions. Different antenna ports are antenna ports with different antenna port numbers, and/or antenna ports with one antenna port number for sending or receiving information on different time and/or frequency and/or code domain resources, and/or antenna ports with different antenna port numbers for sending or receiving information on different time and/or frequency and/or code domain resources. A resource identity includes a channel state information reference signal (CSI-RS) resource identity, an SRS resource identity, a resource identity of a synchronization signal/synchronization signal block, a resource identity of a preamble sequence transmitted on a PRACH, or a DMRS resource identity, and is used to indicate a beam on a resource. For example, a QCL relationship between a downlink signal and a downlink signal, or between an uplink signal and an uplink signal, may mean that the two signals have a same AOA or AOD, indicating that the two signals share one receive beam or transmit beam. For another example, a QCL relationship between a downlink signal and an uplink signal, or between an uplink signal and a downlink signal, may mean that an AOA of the downlink signal is in a correspondence with an AOD of the uplink signal, or that an AOD of the uplink signal is in a correspondence with an AOA of the downlink signal. Therefore, by exploiting beam correspondence, an uplink transmit beam can be determined based on a downlink receive beam, or a downlink receive beam can be determined based on an uplink transmit beam.

Alternatively, a signal having a QCL relationship may be understood as having a corresponding beam, where the corresponding beam includes at least one of the following: a same receive beam, a same transmit beam, a transmit beam corresponding to a receive beam, and a receive beam corresponding to a transmit beam.

Alternatively, a signal having a QCL relationship may be understood as having a corresponding beam pair link (BPL), where the corresponding BPL includes at least one of the following: a same downlink BPL, a same uplink BPL, an uplink BPL corresponding to a downlink BPL, and a downlink BPL corresponding to an uplink BPL.

Unlike LTE, in a new generation communications system, an SRS may be sent through beamforming. Therefore, a transmit beam for the SRS needs to be determined. For high frequencies, if different CCs or BPs are close in physical frequency locations or not widely separated, it can be considered that a spatial QCL relationship can be established between antenna ports for the different CCs or BPs. Therefore, for SRS transmission on different CCs or BPs, if the transmission is triggered by one piece of signaling, for example, by DCI, MAC, or RRC, and the different CCs or BPs are close in frequency locations or not widely separated, it can be considered that the different CCs or BPs have a spatial QCL relationship. Corresponding description in English is given as follows:

"Different from LTE, SRS in NR can be beamformed, and therefore the determining of SRS Tx beam should be investigated. One straightforward way is to indicate the Tx beam of SRS for each CC/BP. However, since the Tx beam of SRS was agreed to be indicated by DCI or MAC CE, the indication overhead should be taken into consideration. As discussed in [7], for high frequency, if CCs are physically co-located and not widely separated in frequency domain, spatial-QCL can be assumed between antenna ports from different CCs. Hence, for SRS switching among CCs or BPs with single triggering, SRS Tx beam indication for one CC/BP is enough for CCs/BPs not widely separated in frequency domain, and the indication overhead can be reduced.

Proposal 8: Consider SRS Tx beam indication for SRS switching among CCs and BPs with single triggering based on cross-carrier spatial-QCL."

Embodiment 2

Embodiment 2 may be implemented alone, or may be used in combination with any possible implementation solution in Embodiment 1. This is not limited in this embodiment of this application. Based on the content previously described in Embodiment 1, this embodiment of this application provides a communication method. This method is applicable to a scenario in which there is not only a frequency domain resource used for transmitting uplink control information and/or uplink data, but also a frequency domain resource not used for transmitting uplink control information and/or uplink data. In this scenario, to exploit channel reciprocity to determine a downlink channel state corresponding to a frequency domain resource, an uplink reference signal needs to be sent on this frequency domain resource. If there is a frequency domain resource not used for transmitting uplink control information and/or uplink data, the uplink reference signal needs to be sent not only on a frequency domain resource used for transmitting uplink control information and/or uplink data, but also on the frequency domain resource not used for transmitting uplink control information and/or uplink data. In this case, a first device needs to switch between the frequency domain resource used for transmitting uplink control information and/or uplink data and the frequency domain resource not used for transmitting uplink control information and/or uplink data. With the communication method provided in this embodiment of this application, unnecessary switching between frequency domain resources under a plurality of numerologies (numerology) can be reduced, where the numerology includes a subcarrier spacing and/or a cyclic prefix CP. The frequency domain resource for transmitting uplink control information and/or uplink data may be a frequency domain resource other than a second frequency domain resource, or may be the second frequency domain resource.

In a communications system, sending of uplink reference signals by a plurality of first devices can be configured by using one piece of DCI (in DCI format 3B), and configuration information of an uplink reference signal for each first device is a part of the DCI. The DCI may be used to configure the first device to send uplink reference signals on a plurality of frequency domain resources. For example, when there is a relatively small quantity of frequency domain resources, the DCI may directly carry identities of the frequency domain resources. Alternatively, some sets of frequency domain resources may be preset, and the DCI directly carries an identity of a set of frequency domain resources, to trigger all frequency domain resources included in the set of frequency domain resources, where the frequency domain resource set may be configured by using higher layer signaling. The frequency domain resource used for transmitting uplink control information and/or uplink data and the frequency domain resource not used for transmitting uplink control information and/or uplink data may be triggered by one piece of DCI.

Optionally, the first configuration information is further used to instruct the first device to send a first uplink reference signal on a first frequency domain resource, where the first uplink reference signal is used for uplink channel sounding. The first configuration information is further used to instruct the first device to send a third uplink reference signal on a third frequency domain resource, where the third uplink reference signal is used for uplink channel sounding. For descriptions about the first uplink reference signal, refer to the content in Embodiment 1. For descriptions about the third uplink reference signal, also refer to the content in Embodiment 1 about the first uplink reference signal. No more details are described herein. The configuration information may further include information such as transmit powers of some uplink reference signals. For example, the first configuration information may include transmit powers of the first uplink reference signal and the third uplink reference signal.

Figure 2B:
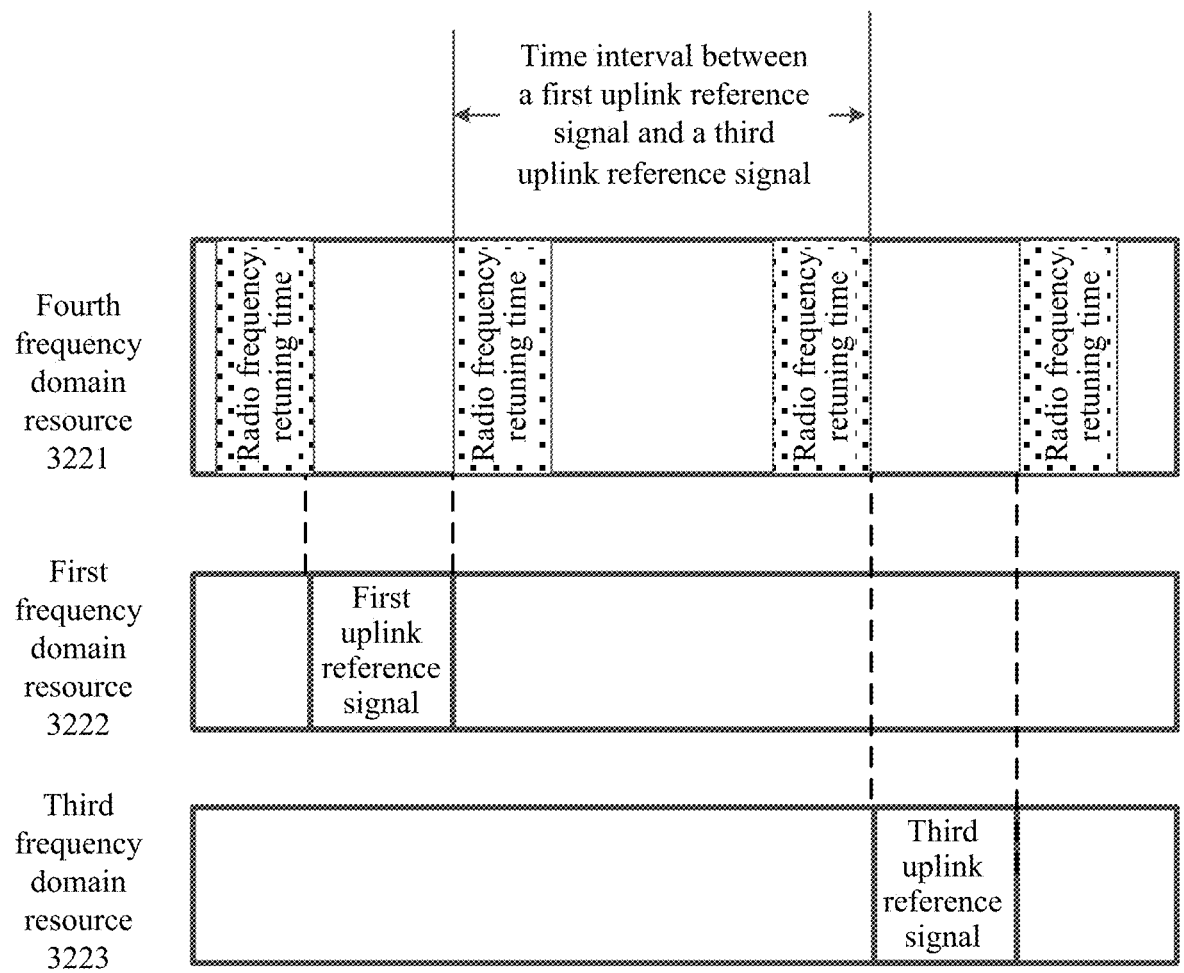
FIG. 2b is a schematic diagram of uplink reference signal sending to which an embodiment of this application is applicable.

FIG. 2b illustratively shows a schematic flowchart of uplink reference signal sending to which an embodiment of this application is applicable. As shown in FIG. 2b, a fourth frequency domain resource 3221, a first frequency domain resource 3222 used for sending a first uplink reference signal, and a third frequency domain resource 3223 used for sending a third uplink reference signal are included. The fourth frequency domain resource is used for transmitting uplink control information and/or uplink data. For the uplink control information and/or uplink data, refer to the content described in Embodiment 1. No more details are described herein. In addition, in this embodiment of this application, the first frequency domain resource and the third frequency domain resource may be one resource or different resources. In a possible implementation solution, the first frequency domain resource and the third frequency domain resource are one resource, while the fourth frequency domain resource and the first frequency domain resource are different resources. The third uplink reference signal may be the second uplink reference signal in Embodiment 1, or another uplink reference signal. The second frequency domain resource and the third frequency domain resource may be one resource or different resources.

A time required for the first device to switch a radio frequency device from a frequency band of one frequency domain resource to a frequency band of another frequency domain resource is referred to as a radio frequency retuning (RF retuning) time. During this period of time, uplink transmission is impossible, no matter for uplink control information or uplink data. For switching from the frequency domain resource used for transmitting uplink control information and/or uplink data to the frequency domain resource not used for transmitting uplink control information and/or uplink data, the frequency band for the radio frequency device may need to be switched from a frequency band of the frequency domain resource used for transmitting uplink control information and/or uplink data to a frequency band of the frequency domain resource not used for transmitting uplink control information and/or uplink data. In this embodiment of this application, the third uplink reference signal is the 1st uplink reference signal used for uplink channel sounding following the first uplink reference signal. In other words, an uplink reference signal to be sent by the first device after the first device has sent the first uplink reference signal is the third uplink reference signal. This embodiment of this application provides several possible implementation solutions in the following example b1 to example b3, to facilitate introduction of Embodiment 2.

EXAMPLE b1

Whether the first device switches to the fourth frequency domain resource for uplink transmission upon completion of transmission of the first uplink reference signal may be determined by determining a time interval between a time for sending a next third uplink reference signal and a time for sending the first uplink reference signal. If the first device determines that the time interval between the first uplink reference signal and the third uplink reference signal is not less than a threshold, the first device transmits uplink control information and/or uplink data on a time domain resource between the first uplink reference signal and the third uplink reference signal. In other words, a second device receives the uplink control information and/or uplink data transmitted by the first device on the time domain resource between the first uplink reference signal and the third uplink reference signal. The uplink control information and/or uplink data is sent when the first device determines that the time interval between the first uplink reference signal and the third uplink reference signal is not less than the threshold. In this way, uplink transmission is performed between two successively sent uplink reference signals only when a time interval between these two uplink reference signals is relatively long. This ensures reasonable switching and can reduce a waste of time between the two uplink reference signals.

In addition, optionally, if the first device determines that the time interval between the first uplink reference signal and the third uplink reference signal is less than the threshold, the first device skips transmitting uplink control information and/or uplink data on the time domain resource between the first uplink reference signal and the third uplink reference signal. In this case, when a time interval between two successively sent uplink reference signals is relatively short, frequent switching from the first frequency domain resource back to the fourth frequency domain resource and then from the fourth frequency domain resource back to the third frequency domain resource needs to occupy twice the radio frequency retuning time. In addition, if the time interval between the two uplink reference signals is less than the two radio frequency retuning times, the first device may fail in switching to the third frequency domain resource to send the third reference signal. In view of such possibility, in this embodiment of this application, no switching is performed when the time interval between two successively sent uplink reference signals is relatively short. For example, the third uplink reference signal may be still sent on the first frequency domain resource. This can not only reduce overheads arising from frequent switching, but also ensure sufficient time for sending the third uplink reference signal.

If no uplink control information and/or uplink data is transmitted on the time domain resource between the first uplink reference signal and the third uplink reference signal, a switch-from parameter of the radio frequency device may be modified to the first frequency domain resource. When the third reference signal needs to be sent, the radio frequency device is directly switched from a frequency band corresponding to the first frequency domain resource to a frequency band corresponding to the third frequency domain resource. In addition, if no uplink control information and/or uplink data is transmitted on the time domain resource between the first uplink reference signal and the third uplink reference signal, uplink control information and/or uplink data that originally need(s) to be transmitted on the time domain resource between the first uplink reference signal and the third uplink reference signal may be postponed. For example, after the third uplink reference signal is sent, if it is determined that uplink control information and/or uplink data can be transmitted between the third uplink reference signal and an uplink reference signal following the third uplink reference signal, the uplink control information and/or uplink data that originally need(s) to be transmitted on the time domain resource between the first uplink reference signal and the third uplink reference signal are/is transmitted on a time domain resource between the third uplink reference signal and the uplink reference signal following the third uplink reference signal.

In a possible implementation solution, if the time interval between the first uplink reference signal and the third uplink reference signal is less than once the radio frequency retuning time, no uplink control information and/or uplink data is transmitted on the time domain resource between the first uplink reference signal and the third uplink reference signal. That is, no switching is performed from the first frequency domain resource to the fourth frequency domain resource. In addition, if the third frequency domain resource is also the first frequency domain resource, the third reference signal is sent; if the third frequency domain resource is not the first frequency domain resource, the third reference signal is not sent because there is no time for switching to the third frequency domain resource.

In an optional solution, if the time interval between the first uplink reference signal and the third uplink reference signal is not less than once the radio frequency retuning time, and is less than twice the radio frequency retuning time, uplink control information and/or uplink data are/is transmitted on the time domain resource between the first uplink reference signal and the third uplink reference signal. That is, no switching is performed from the first frequency domain resource to the fourth frequency domain resource.

The threshold in the example b1 may be preset, or may be configured by the network side, for example, configured periodically, or may be determined based on at least one of the radio frequency retuning time of the first device, and a subcarrier spacing, a slot, and a quantity of symbols of a resource for sending the first uplink reference signal and the third uplink reference signal. In a possible implementation of this embodiment of this application, the threshold is not less than twice the radio frequency retuning time. In this way, the first device has sufficient time to complete frequency band switching twice for the radio frequency device between the first reference signal and the second reference signal, so as to send the third reference signal successfully.

In another possible implementation, the threshold is not less than a sum of twice the radio frequency retuning time and a length of k time units, where k is a number not less than 0, and the time unit is a slot, a symbol, a transmission time interval (TTI), a subframe, a mini-slot, or the like. k may be preset. For example, a value of k is preset in a protocol to be 1. Alternatively, k may be configured by a base station. For example, the base station configures the value of k to be 2 by using RRC, a MAC CE, or DCI. For example, the value of k may be 0, 0.5, or 1. In this way, the first device can have sufficient time to complete frequency band switching twice for the radio frequency device between the first reference signal and the second reference signal, so that the third reference signal can be sent successfully. In addition, the first device can have time to transmit uplink control information and/or uplink data after the first switching.

In a third possible implementation, the threshold is not less than a sum of twice the radio frequency retuning time, the length of the k time units, and a preset offset, where the offset is less than a length of one symbol. In this way, first, the first device can have sufficient time to complete frequency band switching twice for the radio frequency device between the first reference signal and the second reference signal, so that the third reference signal can be sent successfully. Second, the first device can have time to transmit uplink control information and/or uplink data after the first switching. Third, a time for transmitting uplink control information and/or uplink data can be increased. Further, the threshold may be an integer multiple of the time unit. In this way, uplink control information and/or uplink data of an integer number of time units can be transmitted between the first uplink reference signal and the third uplink reference signal. Therefore, time domain resources between the first uplink reference signal and the third uplink reference signal can be effectively utilized.

EXAMPLE b2

Whether the first device switches to the fourth frequency domain resource for uplink transmission after having sent the first uplink reference signal can be further determined by determining whether the first uplink reference signal and the third uplink reference signal are triggered by one piece of DCI, one MAC CE message, or one piece of RRC signaling. Uplink reference signals triggered by one piece of DCI, one MAC CE message, or one piece of RRC signaling may be considered to be uplink reference signals that are relatively close in time. To avoid insufficiency of time to support time overheads brought about by switching, if the first configuration information is determined to be further used to indicate a resource for the third uplink reference signal and the first configuration information is one piece of DCI, one MAC CE message, or one piece of RRC signaling, the first device transmits uplink control information and/or uplink data on the time domain resource between the first uplink reference signal and the third uplink reference signal. In other words, a second device receives the uplink control information and/or uplink data transmitted by the first device on the time domain resource between the first uplink reference signal and the third uplink reference signal. The uplink control information and/or uplink data is sent when the first device determines that the first configuration information is further used to indicate a resource for the third uplink reference signal and that the first configuration information is one piece of DCI or one MAC CE message. For a definition of one piece of DCI, one MAC CE message, or one piece of RRC signaling, refer to the descriptions in Embodiment 1. No more details are described herein. Optionally, the first uplink reference signal and the third uplink reference signal are reference signals within one uplink reference signal transmission period.

EXAMPLE b3

In this embodiment of this application, an uplink reference signal resource set or uplink reference signal resource configuration may be defined. For related introductions, refer to the descriptions in Embodiment 1.

In an optional solution, if determining that a first resource for sending the first uplink reference signal and a third resource for sending the third uplink reference signal belong to one uplink reference signal resource set or one uplink reference signal resource configuration, the first device transmits uplink control information and/or uplink data on the time domain resource between the first uplink reference signal and the third uplink reference signal. In other words, the second device receives the uplink control information and/or uplink data transmitted by the first device on the time domain resource between the first uplink reference signal and the third uplink reference signal. The uplink control information and/or uplink data is sent when the first device determines that the first resource for sending the first uplink reference signal and the third resource for sending the third uplink reference signal belong to one uplink reference signal resource set or one uplink reference signal resource configuration. Optionally, the first uplink reference signal and the third uplink reference signal are reference signals within one uplink reference signal transmission period. It is generally considered that reference signal resources corresponding to one reference signal set or one uplink reference signal resource configuration are relatively close in time domain. Therefore, reference signal resources corresponding to one reference signal set or one uplink reference signal resource configuration do not require switching between frequency domain resources, that is, RF switching.

Embodiment 3

Figure 2C:
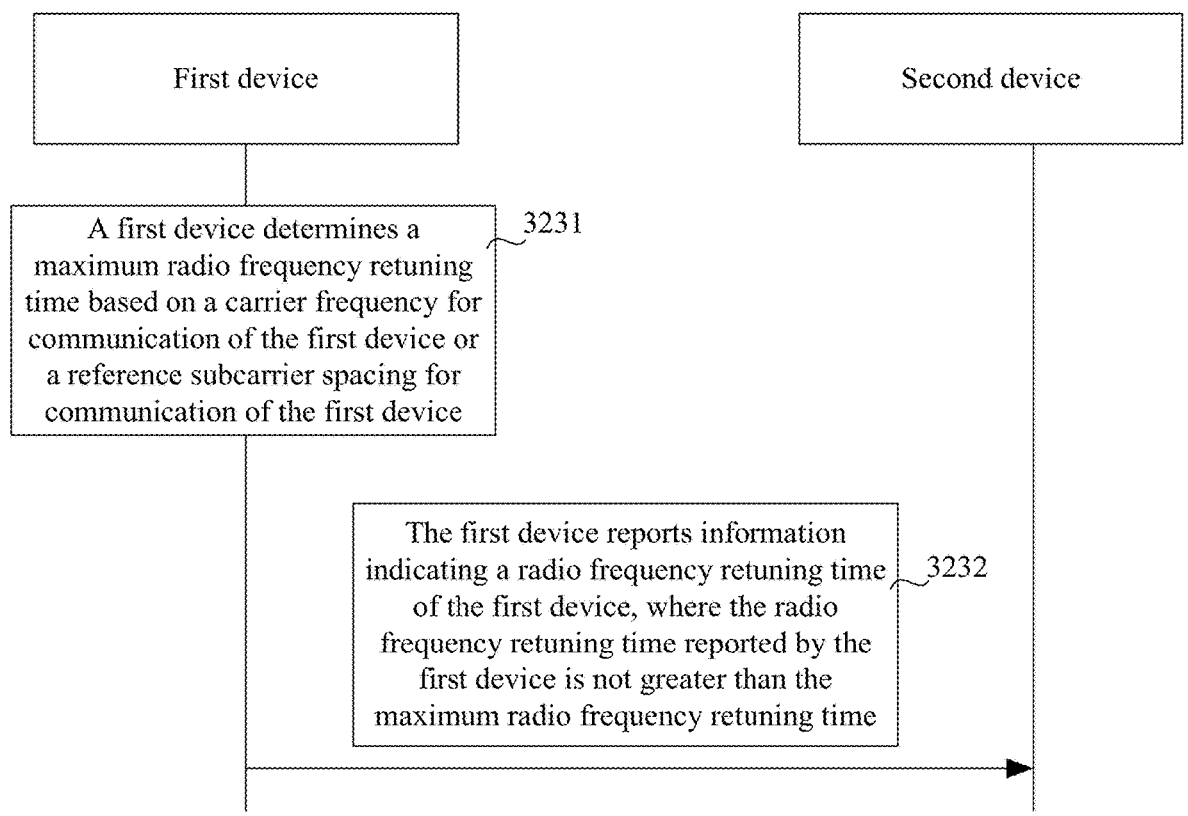
FIG. 2c is a schematic flowchart of another communication method according to an embodiment of this application.

Embodiment 3 may be implemented alone, may be used in combination with any possible implementation solution in Embodiment 1, may be used in combination with any possible implementation solution in Embodiment 2, or may be used in combination with any possible implementation solution in Embodiment 1 and any possible implementation solution in Embodiment 2. This is not limited in this embodiment of this application. Based on the content previously described in Embodiment 1, FIG. 2c illustratively shows a schematic flowchart of a communication method according to an embodiment of this application. As shown in FIG. 2c, the communication method includes the following steps.

Step 3231: A first device determines a maximum radio frequency retuning time based on a carrier frequency for communication of the first device or a reference subcarrier spacing for communication of the first device.

The maximum radio frequency retuning time in this embodiment of this application is determined based on the carrier frequency for communication of the first device or the reference subcarrier spacing for communication of the first device. The maximum radio frequency retuning time is applicable to a wider frequency band range, for example, 0 GHz to 100 GHz. For different first devices, if they have a same carrier frequency range, maximum radio frequency retuning times of the two first devices are equal. For example, for a plurality of first devices, if a carrier frequency range of these first devices is 0 GHz to 6 GHz, their maximum radio frequency retuning time may be 500 µs; and if a carrier frequency range of these first devices is 6 GHz to 100 GHz, their maximum radio frequency retuning time may be 125 µs. Alternatively, the maximum radio frequency retuning time may be determined in other manners depending on the carrier frequency range. This is not limited in this embodiment of this application. The carrier frequency for communication of the first device may be a carrier frequency for current transmission, for example, a carrier frequency of a detected synchronization signal, or a carrier frequency of a BP configured by a base station.

In addition, if different first devices have a same reference carrier spacing, maximum radio frequency retuning times of the two first devices are equal. For example, for a plurality of first devices, if a reference subcarrier spacing of these first devices is 15 kHz, a maximum radio frequency retuning time may be 500 µs; and if a reference subcarrier spacing of these first devices is 60 kHz, a maximum radio frequency retuning time may be 125 µs. Alternatively, the maximum radio frequency retuning time may be determined in other manners depending on the reference subcarrier spacing. This is not limited in this embodiment of this application.

The reference subcarrier spacing may be preset, or may be determined based on a factor such as a carrier frequency. For example, the reference subcarrier spacing may be one of subcarrier spacings of frequency domain resources configured for communication of the first device, for example, a subcarrier spacing of a frequency domain resource capable of transmitting uplink control information and/or uplink data. Alternatively, the reference subcarrier spacing may be a largest value of all subcarrier spacings of frequency domain resources configured for communication of the first device. In this way, accuracy of the reported radio frequency retuning time can be improved. Alternatively, the reference subcarrier spacing may be a smallest value of all subcarrier spacings of frequency domain resources configured for communication of the first device. Alternatively, the reference subcarrier spacing may be a subcarrier spacing that is in a correspondence with the carrier frequency for communication of the first device, for example, preconfigured by a network side, learned of by the first device in advance, or specified in a protocol. Alternatively, the reference subcarrier spacing may be a largest value of subcarrier spacings that are in a correspondence with the carrier frequency for communication of the first device. Alternatively, the reference subcarrier spacing may be a smallest value of subcarrier spacings that are in a correspondence with the carrier frequency for communication of the first device. Alternatively, the reference subcarrier spacing may be a subcarrier spacing that is predefined as a reference subcarrier spacing, for example, predefined in a protocol or through negotiation between the first device and a second device. Alternatively, the reference subcarrier spacing may be a subcarrier spacing that is configured as a reference subcarrier spacing, for example, preconfigured by the network side.

Step 3232: The first device reports information indicating a radio frequency retuning time of the first device, where the radio frequency retuning time reported by the first device is not greater than the maximum radio frequency retuning time. In other words, the second device receives the information reported by the first device for indicating the radio frequency retuning time of the first device. In this way, the network side can have more accurate knowledge about the radio frequency retuning time of the first device. In addition, for a wide frequency band range, the radio frequency retuning time of the first device varies with the carrier frequency or the reference subcarrier spacing. In this embodiment of this application, the maximum radio frequency retuning time is determined based on the carrier frequency or the reference subcarrier spacing, and in turn, the radio frequency retuning time of the first device is determined more accurately.

In an optional implementation solution, a quantity of bits occupied by the information indicating the radio frequency retuning time of the first device is determined by the maximum radio frequency retuning time. For example, when the maximum radio frequency retuning time is 125 µs, the quantity of bits occupied by the information indicating the radio frequency retuning time of the first device is 4; when the maximum radio frequency retuning time is 4 times 125 µs, that is, 500 µs, the quantity of bits occupied by the information indicating the radio frequency retuning time of the first device is 4 times 4, that is, 16. This can ensure a constant precision of quantification.

The information indicating the radio frequency retuning time of the first device may be an index of the radio frequency retuning time of the first device. For example, some indexes may be predefined to indicate different radio frequency retuning times. The first device reports an index of a radio frequency retuning time, and a network device can determine the radio frequency retuning time based on the index of the radio frequency retuning time. The index of the radio frequency retuning time may directly be the radio frequency retuning time, or may be an identifier that can indicate the radio frequency retuning time. Alternatively, the information indicating the radio frequency retuning time of the first device may be an index indicating a quantity of symbols corresponding to the radio frequency retuning time of the first device, where a subcarrier spacing corresponding to the symbols is the reference subcarrier spacing. For example, some indexes may be predefined to indicate quantities of symbols corresponding to different radio frequency retuning times. The first device reports an index of a quantity of symbols corresponding to a radio frequency retuning time, and the network device can determine the quantity of symbols based on the index of the quantity of symbols corresponding to the radio frequency retuning time, and further determine the radio frequency retuning time based on the quantity of symbols. The index of the quantity of symbols corresponding to the radio frequency retuning time may directly be the quantity of symbols corresponding to the radio frequency retuning time, or may be an identifier that can indicate the quantity of symbols corresponding to the radio frequency retuning time.

An example is given below. For example, a protocol predefines that quantities of symbols corresponding to radio frequency retuning times that can be reported by the first device are {0, 0.5, 1, 1.5 . . . 6, 6.5, 7}. When the carrier frequency range of the first device is 0 GHz to 6 GHz, the radio frequency retuning time is 4 symbols, corresponding to 500*4/7=286 µs; when the carrier frequency is greater than 6 GHz, the radio frequency retuning time is 6 symbols, corresponding to 125*6/7=107 µs. Therefore, the network side determines that the radio frequency retuning time is 286 µs when the carrier frequency range is 0 GHz to 6 GHz, and that the radio frequency retuning time is 107 µs when the carrier frequency is greater than 6 GHz.

If the first device determines that the carrier frequency for current transmission is 3 GHz, the first device reports 4 symbols, corresponding to 500*4/7=286 µs. Then a base station determines that the radio frequency retuning time is 286 µs when the carrier frequency is 3 GHz.

If the first device determines that the carrier frequency for current transmission is 3 GHz and 30 GHz, according to the foregoing example, the first device reports two values, that is, 4 symbols corresponding to 3 GHz and 6 symbols corresponding to 30 GHz, which correspond to 500*4/7=286 µs and 125*6/7=107 µs, respectively. Therefore, the base station determines that the radio frequency retuning time is 286 µs when the carrier frequency range is 3 GHz, and that the radio frequency retuning time is 107 µs when the carrier frequency is greater than 30 GHz.

The foregoing retuning times are quantified values, and an actual radio frequency retuning time may be a value close to the quantified value. For example, the length of 4 symbols is 500*4/7=286 µs, but when the actual radio frequency retuning time is 288 µs or 284 µs, the reported radio frequency retuning time is still 4 symbols.

Figure 3:
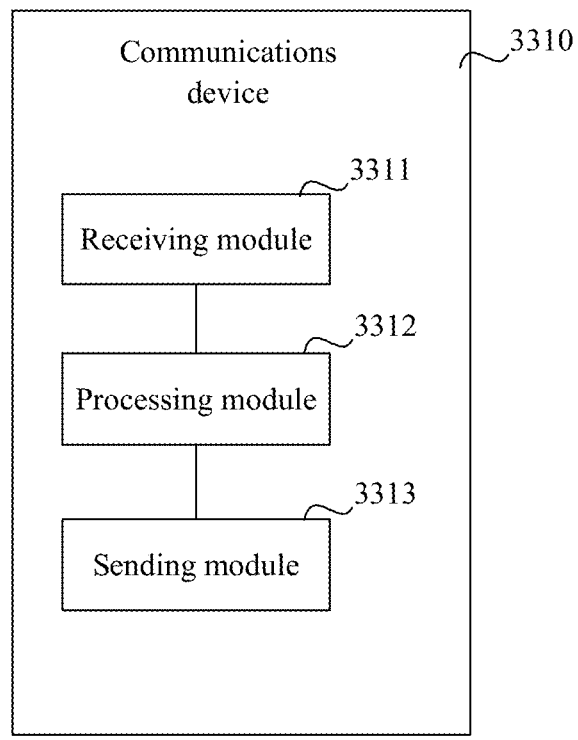
FIG. 3 is a schematic structural diagram of a communications device according to an embodiment of this application.

Based on the foregoing embodiments and a same conception, FIG. 3 is a schematic diagram of a communications device according to an embodiment of this application. As shown in FIG. 3, the communications device 3310 may be a terminal device, or may be a chip or a circuit, for example, a chip or a circuit that can be disposed in a terminal device. The terminal device may correspond to the first device in the foregoing method. The communications device can implement the steps performed by the first device in the method corresponding to any one or more shown in FIG. 2. The communications device may include a processing module 3312, a receiving module 3311, and a sending module 3313.

The receiving module 3311 is configured to receive first configuration information on a second frequency domain resource, where the first configuration information is used to indicate a first resource for a first device to send a first uplink reference signal on a first frequency domain resource and a second resource for the first device to send a second uplink reference signal on the second frequency domain resource; the first frequency domain resource is not used for transmitting uplink data and/or uplink control information; and the first uplink reference signal is used for uplink channel sounding, and the second uplink reference signal is used for uplink channel sounding. The processing module 3312 is configured to determine, based on the first configuration information, that a QCL relationship is present between the first antenna port for the first uplink reference signal and a second antenna port for the second uplink reference signal. The sending module 3313 is configured to send the first uplink reference signal on the first antenna port, where the sending is based on the QCL relationship between the first antenna port and the second antenna port.

In a possible design, the first configuration information is carried in one piece of downlink control information. The processing module 3312 is configured to determine that the one piece of downlink control information DCI is used to instruct the first device to send the first uplink reference signal on the first frequency domain resource and to send the second uplink reference signal on the second frequency domain resource, so as to determine that a QCL relationship is present between the first antenna port for the first uplink reference signal and the second antenna port for the second uplink reference signal.

In a possible design, the processing module 3312 is configured to determine that the first resource for the first device to send the first uplink reference signal on the first frequency domain resource and the second resource for the first device to send the second uplink reference signal on the second frequency domain resource belong to one uplink reference signal resource set or one uplink reference signal resource configuration, so as to determine that a QCL relationship is present between the first antenna port for the first uplink reference signal and the second antenna port for the second uplink reference signal.

In a possible design, for a condition to be met by the first frequency domain resource and the second frequency domain resource, reference may be made to the content described in the foregoing method embodiments. No more details are described herein.

In a possible design, the first uplink reference signal is in a correspondence with the second uplink reference signal.

In a possible design, the first frequency domain resource is a first component carrier, and the second frequency domain resource is a second component carrier. In a possible design, the first frequency domain resource is a first bandwidth part, and a second frequency domain resource is a second bandwidth part.

It can be understood that, for functions of the modules in the communications device 3310, reference may be made to implementations of corresponding method embodiments. No more details are described herein.

Figure 3A:
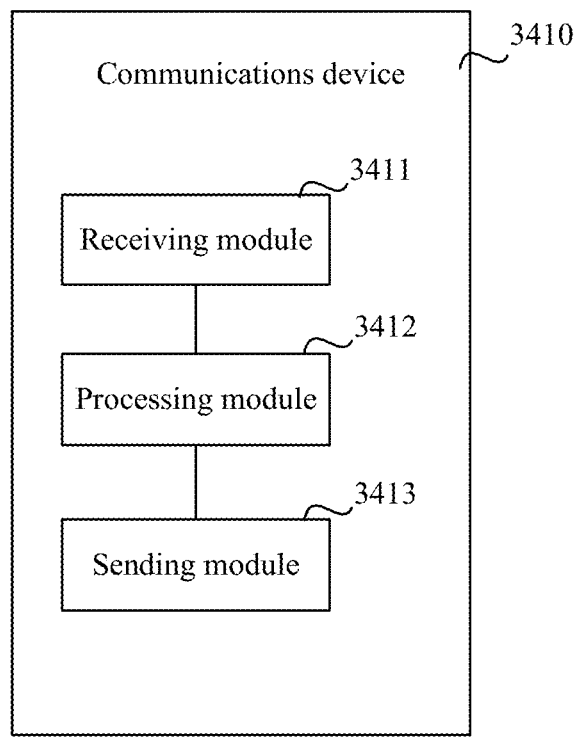
FIG. 3a is a schematic structural diagram of another communications device according to an embodiment of this application.

Based on the foregoing embodiments and a same conception, FIG. 3a is a schematic diagram of a communications device according to an embodiment of this application. As shown in FIG. 3a, the communications device 3410 may be a terminal device, or may be a chip or a circuit, for example, a chip or a circuit that can be disposed in a terminal device. The terminal device may correspond to the first device in the foregoing method. The communications device can implement the steps performed by the first device in the method corresponding to any one or more shown in FIG. 2a. The communications device may include a processing module 3412, a receiving module 3411, and a sending module 3413.

The receiving module 3411 receives first configuration information on a second frequency domain resource, where the first configuration information is used to indicate a resource for a first device to send a first uplink reference signal on a first frequency domain resource; the first frequency domain resource is not used for transmitting uplink data and/or uplink control information; the first uplink reference signal is used for uplink channel sounding; and the first frequency domain resource is further used for the first device to receive a third downlink reference signal. The processing module 3412 is configured to determine that a QCL relationship is present between the first antenna port for the first uplink reference signal and a third antenna port for the third downlink reference signal. The sending module 3413 is configured to send the first uplink reference signal on the first antenna port, where the sending is based on the presence of the QCL relationship between the first antenna port for the first uplink reference signal and the third antenna port for the third downlink reference signal.

It can be understood that, for functions of the modules in the communications device 3410, reference may be made to implementations of corresponding method embodiments. No more details are described herein.

Figure 3B:
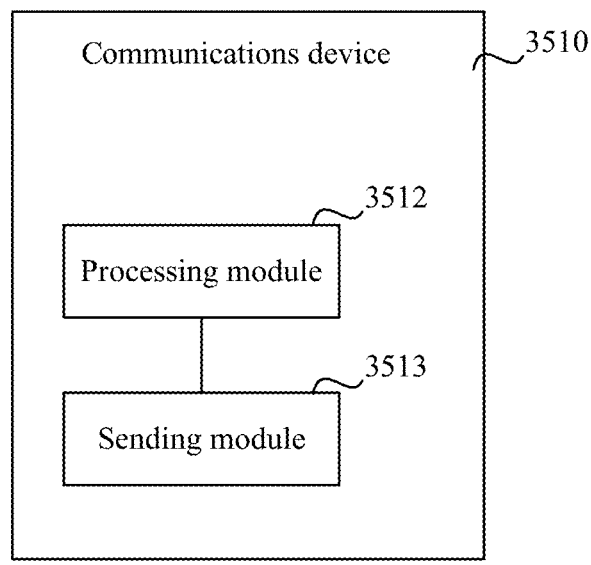
FIG. 3b is a schematic structural diagram of another communications device according to an embodiment of this application.

Based on the foregoing embodiments and a same conception, FIG. 3b is a schematic diagram of a communications device according to an embodiment of this application. As shown in FIG. 3b, the communications device 3510 may be a terminal device, or may be a chip or a circuit, for example, a chip or a circuit that can be disposed in a terminal device. The terminal device may correspond to the first device in the foregoing method. The communications device can implement the steps performed by the first device in the method corresponding to any one or more shown in FIG. 2b. The communications device may include a processing module 3512 and a sending module 3513.

The processing module 3512 is configured to determine that a time interval between a first uplink reference signal and a third uplink reference signal is not less than a threshold, or determine that first configuration information is further used to indicate a resource for the third uplink reference signal, where the first configuration information is one piece of DCI or one MAC CE message, or determine that a first resource for sending the first uplink reference signal and a third resource for sending the third uplink reference signal belong to one uplink reference signal resource set or one uplink reference signal resource configuration. The sending module 3513 is configured to transmit uplink control information and/or uplink data on a time domain resource between the first uplink reference signal and the third uplink reference signal, where the third uplink reference signal is the 1st uplink reference signal used for uplink channel sounding following the first uplink reference signal. The first configuration information is further used to instruct the first device to send the third uplink reference signal on a third frequency domain resource, where the third uplink reference signal is used for uplink channel sounding.

In a possible design, for content about the threshold, reference may be made to the descriptions in the foregoing method embodiments. No more details are described herein.

In a possible design, the first frequency domain resource is also the third frequency domain resource.

It can be understood that, for functions of the modules in the communications device 3510, reference may be made to implementations of corresponding method embodiments. No more details are described herein.

Figure 3C:
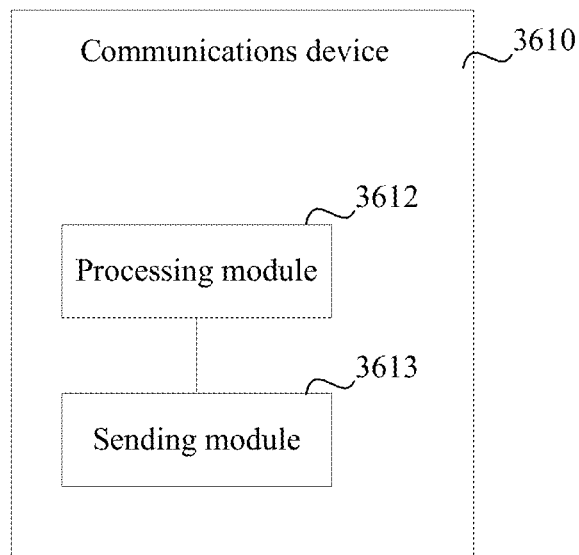
FIG. 3c is a schematic structural diagram of another communications device according to an embodiment of this application.

Based on the foregoing embodiments and a same conception, FIG. 3c is a schematic diagram of a communications device according to an embodiment of this application. As shown in FIG. 3c, the communications device 3610 may be a terminal device, or may be a chip or a circuit, for example, a chip or a circuit that can be disposed in a terminal device. The terminal device may correspond to the first device in the foregoing method. The communications device can implement the steps performed by the first device in the method corresponding to any one or more shown in FIG. 2c. The communications device may include a processing module 3612 and a sending module 3613.

The processing module 3612 is configured to determine a maximum radio frequency retuning time based on a carrier frequency for communication of a first device or a reference subcarrier spacing for communication of the first device. The sending module 3613 is configured to report information indicating a radio frequency retuning time of the first device, where the radio frequency retuning time reported by the first device is not greater than the maximum radio frequency retuning time.

In a possible design, for content about the information indicating the radio frequency retuning time of the first device, the reference subcarrier, and the like, reference may be made to the content in the foregoing method embodiments. No more details are described herein.

It can be understood that, for functions of the modules in the communications device 3610, reference may be made to implementations of corresponding method embodiments. No more details are described herein.

Figure 3D:
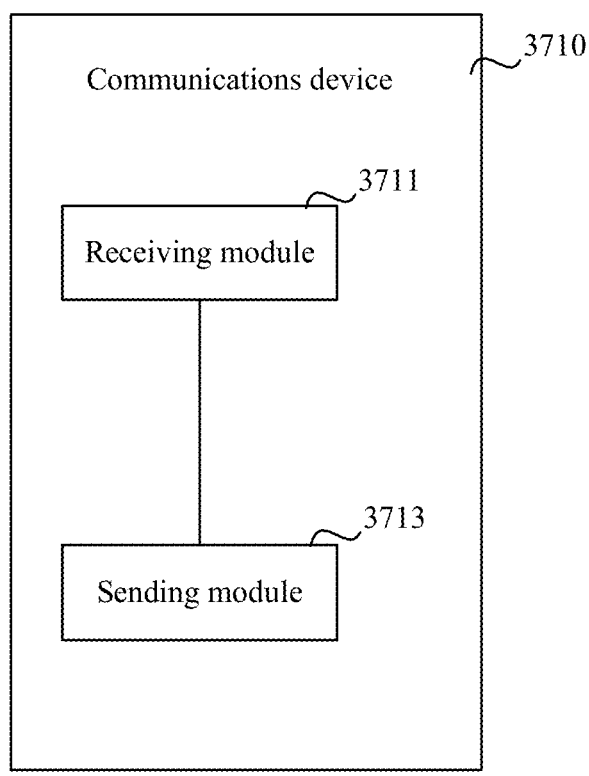
FIG. 3d is a schematic structural diagram of another communications device according to an embodiment of this application.

Based on the foregoing embodiments and a same conception, FIG. 3d is a schematic diagram of a communications device according to an embodiment of this application. As shown in FIG. 3d, the communications device 3710 may be a terminal device, or may be a chip or a circuit, for example, a chip or a circuit that can be disposed in a terminal device. The terminal device may correspond to the first device in the foregoing method. The communications device can implement the steps performed by the first device in the method corresponding to any one or more shown in FIG. 2. The communications device may include a receiving module 3711 and a sending module 3713.

The sending module 3713 is configured to send first configuration information on a second frequency domain resource, where the first configuration information is used to indicate a first resource for a first device to send a first uplink reference signal on a first frequency domain resource and a second resource for the first device to send a second uplink reference signal on the second frequency domain resource; the first frequency domain resource is not used for transmitting uplink data and/or uplink control information; the first uplink reference signal is used for uplink channel sounding, and the second uplink reference signal is used for uplink channel sounding; and a quasi co-location (QCL) relationship is present between a first antenna port for the first uplink reference signal and a second antenna port for the second downlink reference signal. The receiving module 3711 is configured to receive the first uplink reference signal, where the receiving is based on the quasi co-location relationship between the first antenna port and the second antenna port. In other words, beam information of the first antenna port can be determined based on beam information of the second antenna port, and then the first uplink reference signal can be sent based on the determined beam information of the first antenna port. This can spare network-side beam configuration for the first frequency domain resource, and reduce overheads for transmitting configuration information. Optionally, the first uplink reference signal is received on the first antenna port.

For introductions about the first frequency domain resource and the second frequency domain resource, refer to the content in the foregoing method embodiments. No more details are described herein. In a possible design, the first frequency domain resource is a first component carrier, and the second frequency domain resource is a second component carrier. In a possible design, the first frequency domain resource is a first bandwidth part, and a second frequency domain resource is a second bandwidth part.

It can be understood that, for functions of the modules in the communications device 3710, reference may be made to implementations of corresponding method embodiments. No more details are described herein.

Figure 3E:
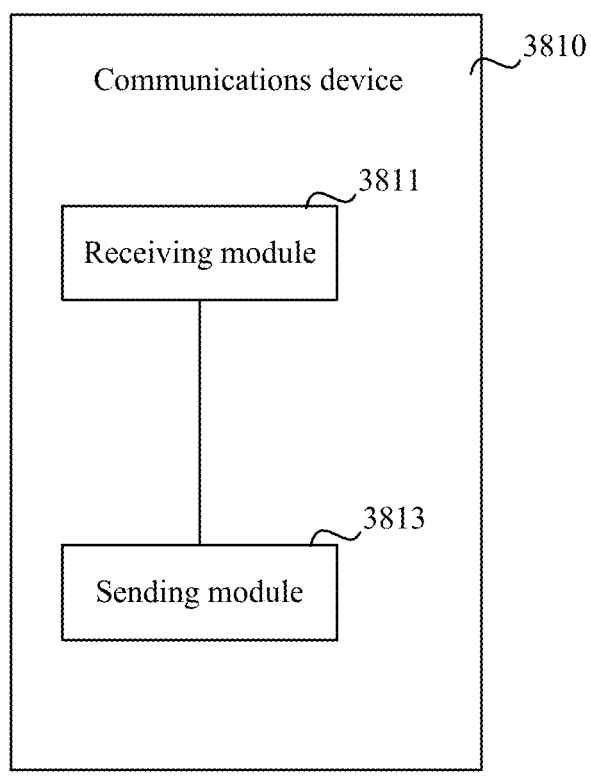
FIG. 3e is a schematic structural diagram of another communications device according to an embodiment of this application.

Based on the foregoing embodiments and a same conception, FIG. 3e is a schematic diagram of a communications device according to an embodiment of this application. As shown in FIG. 3e, the communications device 3810 may be a terminal device, or may be a chip or a circuit, for example, a chip or a circuit that can be disposed in a terminal device. The terminal device may correspond to the first device in the foregoing method. The communications device can implement the steps performed by the first device in the method corresponding to any one or more shown in FIG. 2a. The communications device may include a receiving module 3811 and a sending module 3813.

The sending module 3813 sends first configuration information on a second frequency domain resource, where the first configuration information is used to indicate a resource for a first device to send a first uplink reference signal on a first frequency domain resource; the first frequency domain resource is not used for transmitting uplink data and/or uplink control information; the first uplink reference signal is used for uplink channel sounding; the first frequency domain resource is further used for the first device to receive a third downlink reference signal; and a quasi co-location (QCL) relationship is present between a first antenna port for the first uplink reference signal and a third antenna port for the third downlink reference signal. The receiving module 3811 receives the first uplink reference signal, where the receiving is based on the presence of the QCL relationship between the first antenna port for the first uplink reference signal and the third antenna port for the third downlink reference signal. In other words, beam information of the first antenna port can be determined based on beam information of the third antenna port, and then the first uplink reference signal can be sent based on the determined beam information of the first antenna port. This can spare network-side beam configuration for the first frequency domain resource, and reduce overheads for transmitting configuration information. Optionally, the first uplink reference signal is received on the first antenna port.

It can be understood that, for functions of the modules in the communications device 3810, reference may be made to implementations of corresponding method embodiments. No more details are described herein.

Figure 3F:
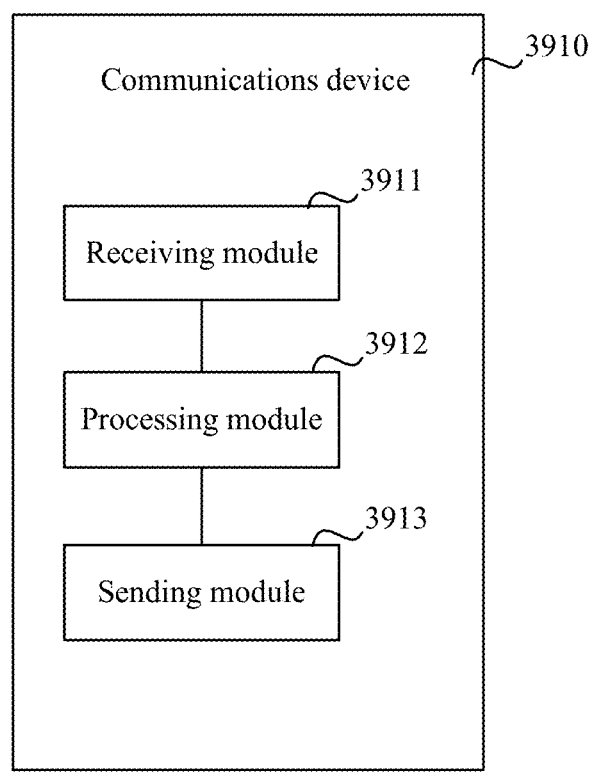
FIG. 3f is a schematic structural diagram of another communications device according to an embodiment of this application.

Based on the foregoing embodiments and a same conception, FIG. 3*f* is a schematic diagram of a communications device according to an embodiment of this application. As shown in FIG. 3*f*, the communications device 3910 may be a terminal device, or may be a chip or a circuit, for example, a chip or a circuit that can be disposed in a terminal device. The terminal device may correspond to the first device in the foregoing method. The communications device can implement the steps performed by the first device in the method corresponding to any one or more shown in FIG. 2*b*. The communications device may include a receiving module 3911, and may further include a processing module 3912 and a sending module 3913.

The receiving module 3911 is configured to receive uplink control information and/or uplink data transmitted by a first device on a time domain resource between a first uplink reference signal and a third uplink reference signal, where the third uplink reference signal is the 1st uplink reference signal used for uplink channel sounding following the first uplink reference signal, and the uplink control information and/or uplink data is transmitted by the first device when the first device determines that a time interval between the first uplink reference signal and the third uplink reference signal is not less than a threshold, or determines that the first configuration information is further used to indicate a resource for the third uplink reference signal, and that the first configuration information is one piece of downlink control information (DCI) or one MAC CE message, or determines that a first resource for sending the first uplink reference signal and a third resource for sending the third uplink reference signal belong to one uplink reference signal resource set or one uplink reference signal resource configuration. In this method, the first configuration information is further used to instruct the first device to send the third uplink reference signal on a third frequency domain resource, where the third uplink reference signal is used for uplink channel sounding. In this way, uplink transmission is performed between the first uplink reference signal and the third uplink reference signal only when these two uplink reference signals meet a condition. This ensures reasonable switching and can reduce a waste of time between the two uplink reference signals.

The processing module 3912 may be configured to process the received uplink control information and/or uplink data. The sending module 3913 may be configured to send some information, for example, the first configuration information.

For introductions about the threshold, refer to the content in the foregoing method embodiments. No more details are described herein.

In a possible design, the first frequency domain resource is also the third frequency domain resource.

It can be understood that, for functions of the modules in the communications device 3910, reference may be made to implementations of corresponding method embodiments. No more details are described herein.

Figure 3G:
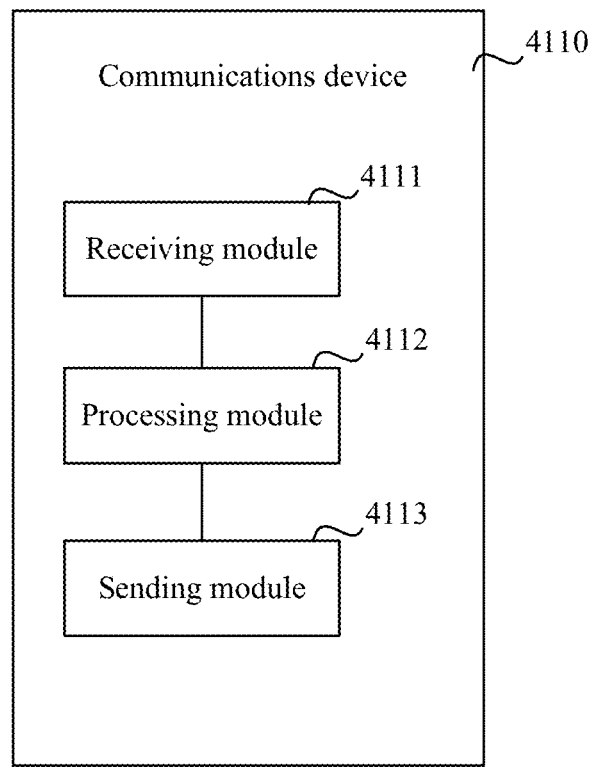
FIG. 3g is a schematic structural diagram of another communications device according to an embodiment of this application.

Based on the foregoing embodiments and a same conception, FIG. 3*g* is a schematic diagram of a communications device according to an embodiment of this application.

As shown in FIG. 3*g*, the communications device 4110 may be a terminal device, or may be a chip or a circuit, for example, a chip or a circuit that can be disposed in a terminal device. The terminal device may correspond to the first device in the foregoing method. The communications device can implement the steps performed by the first device in the method corresponding to any one or more shown in FIG. 2*c*. The communications device may include a receiving module 4111, and may further include a processing module 4112 and a sending module 4113.

The receiving module 4111 is configured to receive information reported by a first device for indicating a radio frequency retuning time of the first device, where the radio frequency retuning time reported by the first device is not greater than a maximum radio frequency retuning time, and the maximum radio frequency retuning time is determined by the first device based on a carrier frequency for communication of the first device or a reference subcarrier spacing for communication of the first device. In this way, a network side can have more accurate knowledge about the radio frequency retuning time of the first device. In addition, for a wide frequency band range, the radio frequency retuning time of the first device varies with the carrier frequency or the reference subcarrier spacing. In this embodiment of this application, the maximum radio frequency retuning time is determined based on the carrier frequency or the reference subcarrier spacing, and in turn, the radio frequency retuning time of the first device is determined more accurately.

The processing module 4112 may be configured to perform processing based on the received information about the radio frequency retuning time. The sending module 4113 may be configured to send some information, for example, a configured reference subcarrier spacing.

For introductions about the information indicating the radio frequency retuning time of the first device, refer to the content in the foregoing method embodiments. No more details are described herein.

In a possible design, a quantity of bits occupied by the information indicating the radio frequency retuning time of the first device is determined by the maximum radio frequency retuning time. This can ensure a constant precision of quantification.

It can be understood that, for functions of the modules in the communications device 4110, reference may be made to implementations of corresponding method embodiments. No more details are described herein.

It should be noted that the unit division in this embodiment of this application is an example, is merely logical function division, and may be other division in actual implementation. The functional units in this embodiment of this application may be integrated into one processing unit, or each of the units may exist alone physically, or two or more units are integrated into one unit. The integrated unit may be implemented in a form of hardware, or may be implemented in a form of a software functional unit.

Figure 4:
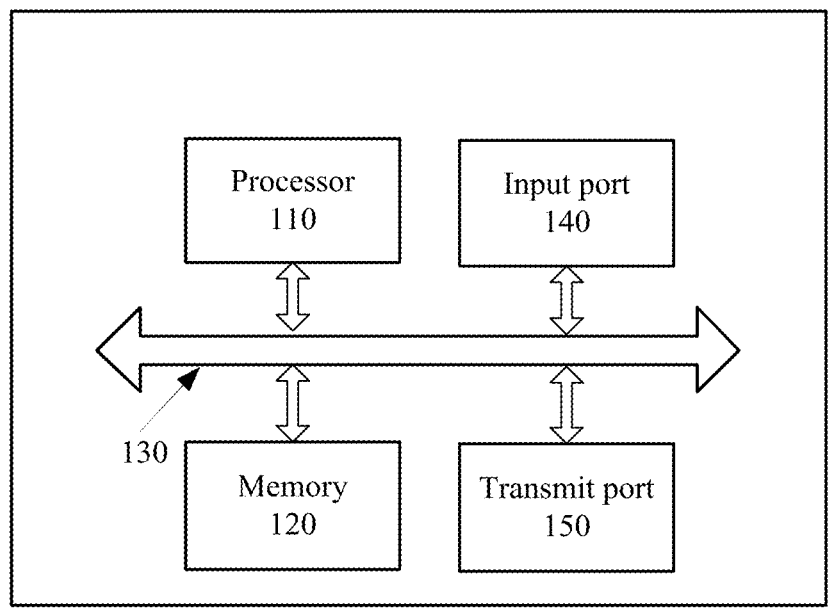
FIG. 4 is a schematic structural diagram of another communications device according to an embodiment of this application.

According to the foregoing method, FIG. 4 is a schematic diagram 1 of a communications device according to an embodiment of this application. As shown in FIG. 4, the communications device may be a terminal device 10, or may be a chip or a circuit, for example, a chip or a circuit that can be disposed in a network device. The terminal device 10 may correspond to the first device in the foregoing method.

The communications device may include a processor 110 and a memory 120. The memory 120 is configured to store an instruction. The processor 110 is configured to execute the instruction stored in the memory 120, to implement the method(s) corresponding to any one or more of FIG. 2, FIG. 2*a*, FIG. 2*b*, and FIG. 2*c*.

Further, the device may further include an input port 140 and a transmit port 150. Further, the device may further include a bus system 130, and the processor 110, the memory 120, the input port 140, and the transmit port 150 may be connected by the bus system 130.

The processor 110 is configured to execute the instruction stored in the memory 120, to control the input port 140 to receive a signal and control the transmit port 150 to send a signal, so as to complete the steps performed by the first device in the foregoing method. The input port 140 and the transmit port 150 may be one physical entity or different physical entities. When being one physical entity, the input port 140 and the transmit port 150 may be collectively referred to as an input/output port. The memory 120 may be integrated in the processor 110, or may be disposed separately from the processor 110.

In an implementation, functions of the input port 140 and the transmit port 150 may be implemented by using a transceiver circuit or a dedicated transceiver chip. The processor 110 may be implemented by using a dedicated processing chip, a processing circuit, a processor, or a general-purpose chip.

In another implementation, the terminal device provided in this embodiment of this application may be implemented by using a general-purpose computer. To be specific, program code that implements functions of the processor 110, the input port 140, and the transmit port 150 is stored in the memory, and the general-purpose processor executes the code in the memory to implement the functions of the processor 110, the input port 140, and transmit port 150.

For concepts, explanations, detailed descriptions, and other steps that are related to the device and the technical solution provided in this embodiment of this application, refer to descriptions about the content in the foregoing method or other embodiments. No more details are described herein.

Figure 5:
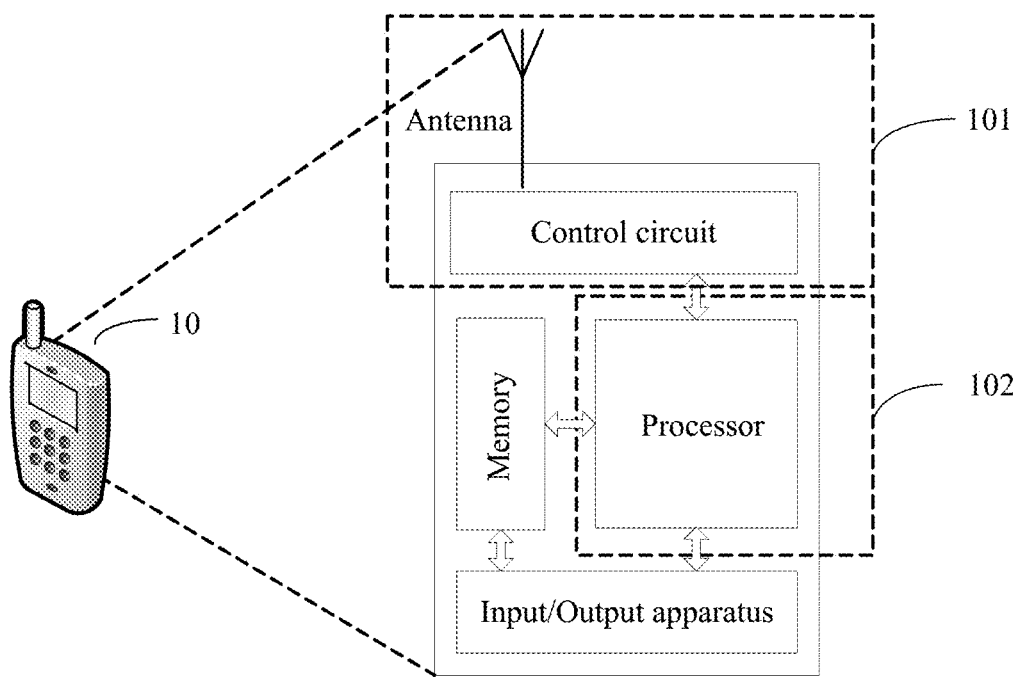
FIG. 5 is a schematic structural diagram of another communications device according to an embodiment of this application.

FIG. 5 is a schematic structural diagram of a terminal device according to this application. The terminal device is applicable to the system shown in FIG. 1. For ease of description, FIG. 5 shows only main components of the terminal device. As shown in FIG. 5, the terminal device 10 includes a processor, a memory, a control circuit, an antenna, and an input/output device. The processor is mainly configured to process a communication protocol and communication data, control the entire terminal device, execute a software program, and process data of the software program, for example, configured to support the terminal device in performing the actions described in the foregoing communication method embodiments. For example, the processor supports the terminal device in performing the actions of the solution related to determining, based on the first configuration information, that a QCL relationship is present between the first antenna port for the first uplink reference signal and the second antenna port for the second uplink reference signal. For another example, the processor supports the terminal device in performing the actions of the solution related to determining, based on the first configuration information, that a quasi co-location QCL relationship is present between the first antenna port for the first uplink reference signal and the third antenna port for the third uplink reference signal. For another example, the processor supports the terminal device in performing the actions of the solution related to determining whether to transmit uplink control information and/or uplink data on a time domain resource between the first uplink reference signal and the third uplink reference signal. For another example, the processor supports the terminal device in performing the actions of the solution related to reporting the information indicating the radio frequency retuning time of the first device. These four types of actions may be performed separately or performed in combination. The memory is mainly used to store a software program and data. For example, the memory stores related information of the first configuration information, the uplink reference signal resource configuration, and the uplink reference signal resource set described in the foregoing embodiments. The control circuit is mainly used for conversion between baseband signals and radio frequency signals and processing of radio frequency signals. The control circuit and the antenna may be jointly referred to as an input/output port, and the input/output port is mainly configured for transmission and reception of radio frequency signals in an electromagnetic wave form. The input/output device, for example, a touchscreen, a display screen, or a keyboard, is mainly configured to receive data input by a user and output data to the user.

After the terminal device is powered on, the processor may read a software program in a storage unit, parse and execute an instruction of the software program, and process data of the software program. When data needs to be sent in a wireless manner, the processor performs baseband processing on the to-be-sent data, and outputs a baseband signal to a radio frequency circuit. After the radio frequency circuit performs radio frequency processing on the baseband signal, a resulting radio frequency signal is sent by the antenna in an electromagnetic wave form. When data is sent to the terminal device, the radio frequency circuit receives a radio frequency signal through the antenna, converts the radio frequency signal into a baseband signal, and outputs the baseband signal to the processor, and the processor converts the baseband signal into data and processes the data.

A person skilled in the art may understand that, for ease of description, FIG. 5 shows only one memory and one processor. In practice, a terminal device may include a plurality of processors and a plurality of memories. The memory may also be referred to as a storage medium, a storage device, or the like. This is not limited in this embodiment of the present disclosure.

In an optional implementation, the processor may include a baseband processor and a central processing unit. The baseband processor is mainly configured to process a communication protocol and communication data, and the central processing unit is mainly configured to control the entire terminal device, execute a software program, and process data of the software program. Functions of the baseband processor and the central processing unit are integrated into the processor in FIG. 5. A person skilled in the art may understand that the baseband processor and the central processing unit may be alternatively independent processors that are interconnected by using techniques such as a bus. A person skilled in the art may understand that the terminal device may include a plurality of baseband processors to adapt to different network standards, the terminal device may include a plurality of central processing units to enhance a processing capability of the terminal device, and various components of the terminal device may be connected to each other by using various buses. The baseband processor may also be expressed as a baseband processing circuit or a baseband processing chip. The central processing unit may also be expressed as a central processing circuit or a central processing chip. A function of processing a communication protocol and communication data may be built into the processor, or may be stored in a storage unit in a form of a software program, so that the processor executes the software program to implement baseband processing functions. For example, in this embodiment of the present disclosure, the antenna and the control circuit that have sending and receiving functions may be considered as a transceiver unit 101 of the terminal device 10, and the processor having a processing function may be considered as a processing unit 102 of the terminal device 10. As shown in FIG. 5, the terminal device 10 includes the transceiver unit 101 and the processing unit 102. The transceiver unit may also be referred as an input/output port, a transceiver, a transceiver device, or the like. Optionally, a component that is in the transceiver unit 101 and configured to implement a receiving function may be considered as a receiving unit, and a component that is in the transceiver unit 101 and configured to implement a sending function may be considered as a sending unit. In other words, the transceiver unit 101 includes a receiving unit and a sending unit. For example, the receiving unit may also be referred to as a receiver, a receiver device, an input port, a receiver circuit, or the like, and the sending unit may be referred to as a transmitter, a transmitter device, a transmit circuit, or the like.

Figure 6:
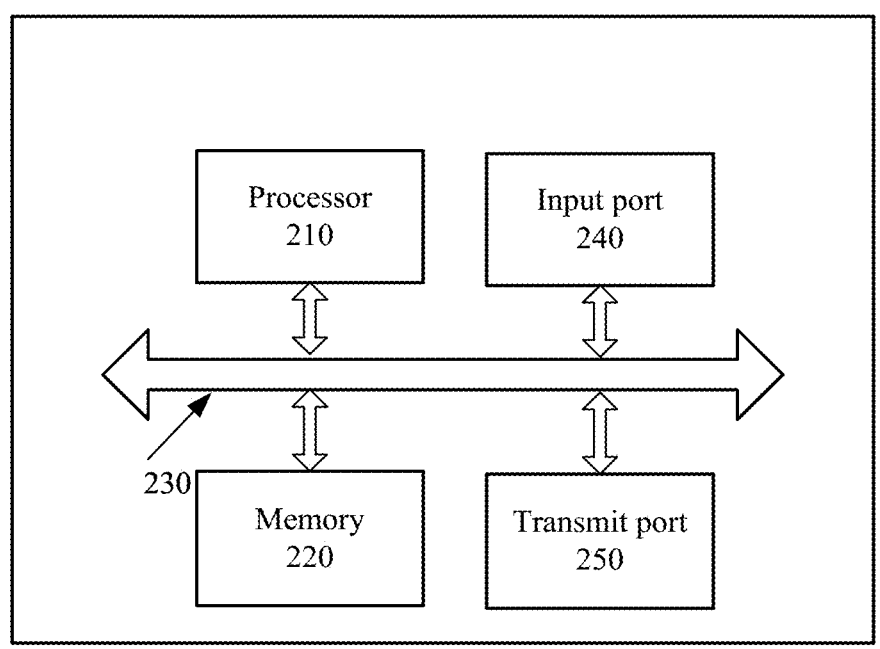
FIG. 6 is a schematic structural diagram of another communications device according to an embodiment of this application.

According to the foregoing method, FIG. 6 is a schematic diagram 2 of a communications device according to an embodiment of this application. As shown in FIG. 6, the communications device may be a network device 20, or may be a chip or a circuit, for example, a chip or a circuit that can be disposed in a network device. The network device 20 corresponds to the second device in the foregoing method. The communications device may include a processor 210 and a memory 220. The memory 220 is configured to store an instruction. The processor 210 is configured to execute the instruction stored in the memory 220, to enable the device to implement the method(s) corresponding to any one or more of FIG. 2, FIG. 2a, FIG. 2b, and FIG. 2c.

Further, the network may further include an input port 240 and a transmit port 250. Still further, the network may further include a bus system 230.

The processor 210, the memory 220, the input port 240, and the transmit port 250 are connected through the bus system 230. The processor 210 is configured to execute the instruction stored in the memory 220, to control the input port 240 to receive a signal and control the transmit port 250 to send a signal, so as to complete the steps performed by the network device in the foregoing method. The input port 240 and the transmit port 250 may be one physical entity or different physical entities. When being one physical entity, the input port 240 and the transmit port 250 may be collectively referred to as an input/output port. The memory 220 may be integrated in the processor 210, or may be disposed separately from the processor 210.

In an implementation, functions of the input port 240 and the transmit port 250 may be implemented by using a transceiver circuit or a dedicated transceiver chip. The processor 210 may be implemented by using a dedicated processing chip, a processing circuit, a processor, or a general-purpose chip.

In another implementation, the network device provided in this embodiment of this application may be implemented by using a general-purpose computer. To be specific, program code that implements functions of the processor 210, the input port 240, and the transmit port 250 is stored in the memory, and the general-purpose processor executes the code in the memory to implement the functions of the processor 210, the input port 240, and transmit port 250.

For concepts, explanations, detailed descriptions, and other steps that are related to the device and the technical solution provided in this embodiment of this application, refer to descriptions about the content in the foregoing method or other embodiments. No more details are described herein.

Figure 7:
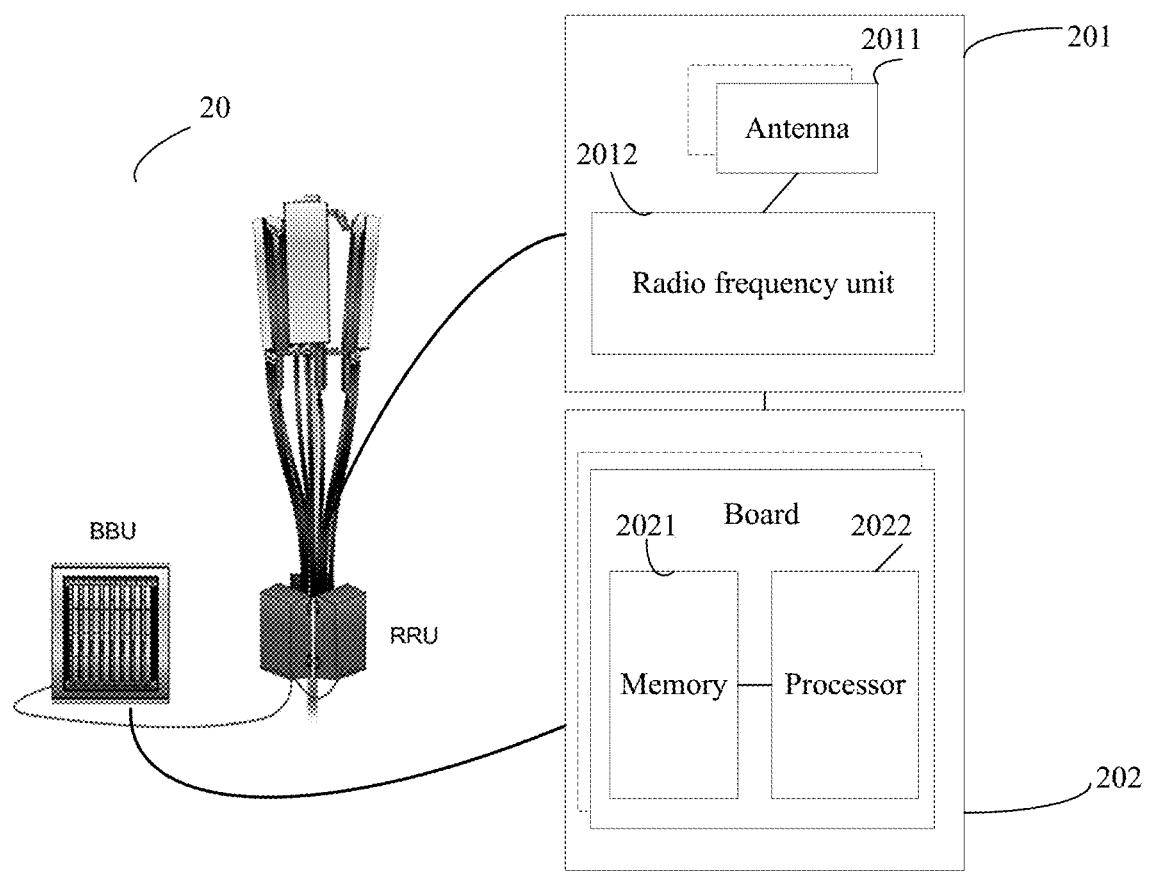
FIG. 7 is a schematic structural diagram of another communications device according to an embodiment of this application.

According to the foregoing method, FIG. 7 is a schematic structural diagram of a network device according to an embodiment of this application. For example, FIG. 7 may be a schematic structural diagram of a base station. As shown in FIG. 7, the base station may be applied to the system shown in FIG. 1. The base station 20 includes one or more radio frequency units, for example a remote radio unit (RRU) 201 and one or more baseband units (BBUs) (also referred to as digital units (DUs)) 202. The RRU 201 may be referred to as a transceiver unit, a transceiver, a transceiver circuit, a transceiver device, or the like, and may include at least one antenna 2011 and a radio frequency unit 2012. The RRU 201 is mainly configured for transmission and reception of radio frequency signals and conversion between radio frequency signals and baseband signals, for example, sending the signaling message in the foregoing embodiment to a terminal device. The BBU 202 is mainly configured to perform baseband processing, control the base station, and the like. The RRU 201 and the BBU 202 may be physically disposed together, or may be physically separated, that is, a distributed base station.

The BBU 202 is a control center of the base station, and may also be referred to as a processing unit. The BBU 202 is mainly configured to implement baseband processing functions such as channel coding, multiplexing, modulation, and spectrum spreading. For example, the BBU (the processing unit) may be configured to control the base station to execute an operation procedure of the network device in the foregoing method embodiments.

In an example, the BBU 202 may include one or more boards, and a plurality of boards may jointly support a radio access network (such as an LTE network) of a single access technology, or may each support a radio access network of a different access technology. The BBU 202 further includes a memory 2021 and a processor 2022. The memory 2021 is configured to store a necessary instruction and necessary data. For example, the memory 2021 stores related information of the first configuration information, the uplink reference signal resource configuration, and the uplink reference signal resource set in the foregoing embodiments. The processor 2022 is configured to control the base station to perform necessary actions. For example, the processor 2022 is configured to control the base station to execute an operation procedure of the network device in the foregoing method embodiments. The memory 2021 and the processor 2022 may serve one or more boards. In other words, each board may be provided with a memory and a processor. Alternatively, a plurality of boards may share a memory and a processor. In addition, a necessary circuit may be further disposed on each board.

According to the method provided in the embodiments of this application, an embodiment of this application further provides a communications system, including the foregoing network device and one or more terminal devices.

It should be understood that in this embodiment of this application, the processor may be a central processing unit (CPU), or the processor may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor or the processor may be any conventional processor, or the like.

The memory may include a read-only memory and a random access memory, and provide an instruction and data for the processor. A part of the memory may further include a non-volatile random access memory.

In addition to a data bus, the bus system may further include a power bus, a control bus, a status signal bus, and the like. However, for clear description, various types of buses are marked as the bus system in the figure.

In an implementation process, steps in the foregoing methods may be implemented by using a hardware integrated logic circuit in the processor, or by using instructions in a form of software. The steps of the method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory or electrically erasable programmable memory, or a register. The storage medium is located in the memory, and the processor reads information in the memory and completes the steps in the foregoing methods in combination with hardware of the processor. To avoid repetition, details are not described herein again.

It should be further understood that "first", "second", "third", "fourth", and various numbers in this specification are merely used for differentiation for ease of description, and do not constitute any limitation on the scope of the embodiments of the present disclosure.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, sequence numbers of the foregoing processes do not indicate an order of execution. An execution order of the processes should be determined based on functions and internal logic of the processes, rather than constitute any limitation on implementation processes of the embodiments of the present disclosure.

A person of ordinary skill in the art may be aware that the illustrative logical blocks and steps described in the embodiments disclosed in this specification may be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, device, or unit, reference may be made to a corresponding process in the foregoing method embodiments, and details are not described herein again.

In the several embodiments provided in this application, it should be understood that the disclosed system, device, and method may be implemented in other manners. For example, the described device embodiments are merely examples. For example, the unit division is merely logical function division and may be other division in actual implementation. For example, a plurality of units or components may be combined or integrated into another system, or some features may be ignored or may be not performed. In addition, the displayed or discussed mutual couplings or direct couplings or communication connections may be indirect couplings or communication connections through some interfaces, apparatuses, or units, and may be implemented in electrical, mechanical, or other forms.

The units described as separate parts may or may not be physically separate. Parts displayed as units may or may not be physical units, and may be located in one position or distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit.

The disclosure also provides the following aspects:

Aspect 1. A communication method, comprising:

receiving, by a first device, first configuration information on a second frequency domain resource, wherein the first configuration information is used to indicate a resource for the first device to send a first uplink reference signal on a first frequency domain resource; the first frequency domain resource is not used for transmitting uplink data and/or uplink control information; the first uplink reference signal is used for uplink channel sounding; and the first frequency domain resource is further used for the first device to receive a third downlink reference signal;

determining, by the first device, that a beam for sending the first uplink reference signal on a first antenna port is also a beam for receiving the third downlink reference signal; and sending, by the first device, the first uplink reference signal on the first antenna port.

Aspect 2. The method according to Aspect 1, wherein the first configuration information is further used to instruct the first device to send a third uplink reference signal on a third frequency domain resource, wherein the third uplink reference signal is used for uplink channel sounding; and the method further comprises:

determining, by the first device, that a time interval between the first uplink reference signal and the third uplink reference signal is not less than a threshold, or determining that the first configuration information is further used to indicate a resource for the third uplink reference signal, and that the first configuration information is one piece of DCI or one MAC CE message, or determining that a first resource for sending the first uplink reference signal and a third resource for sending the third uplink reference signal belong to one uplink reference signal resource set or one uplink reference signal resource configuration; and transmitting, by the first device, uplink control information and/or uplink data on a time domain resource between the first uplink reference signal and the third uplink reference signal, wherein the third uplink reference signal is the 1st uplink reference signal used for uplink channel sounding following the first uplink reference signal.

Aspect 3. The method according to Aspect 2, wherein the threshold meets at least one of the following:

the threshold is not less than twice a radio frequency retuning time;

the threshold is not less than a sum of twice the radio frequency retuning time and a length of k time units, wherein k is a number not less than 0, and the time unit is a slot or a symbol; and the threshold is not less than a sum of twice the radio frequency retuning time, the length of the k time units, and a preset offset, wherein the offset is less than a length of one symbol.

Aspect 4. The method according to Aspect 2 or 3, wherein the first frequency domain resource is also the third frequency domain resource.

Aspect 5. The method according to any one of Aspects 1 to 4, wherein the method further comprises:

determining, by the first device, a maximum radio frequency retuning time based on a carrier frequency for communication of the first device or a reference subcarrier spacing for communication of the first device; and reporting, by the first device, information indicating the radio frequency retuning time of the first device, wherein the radio frequency retuning time reported by the first device is not greater than the maximum radio frequency retuning time.

Aspect 6. The method according to Aspect 5, wherein the information indicating the radio frequency retuning time of the first device comprises:

an index of the radio frequency retuning time of the first device; or an index indicating a quantity of symbols corresponding to the radio frequency retuning time of the first device, wherein a subcarrier spacing corresponding to the symbols is the reference subcarrier spacing.

Aspect 7. The method according to Aspect 5 or 6, wherein a quantity of bits occupied by the information indicating the radio frequency retuning time of the first device is determined by the maximum radio frequency retuning time.

Aspect 8. The method according to any one of Aspects 5 to 7, wherein the reference subcarrier spacing is any one of the following:

one of subcarrier spacings of frequency domain resources configured for communication of the first device;

a largest value of all subcarrier spacings of the frequency domain resources configured for communication of the first device;

a smallest value of all subcarrier spacings of the frequency domain resources configured for communication of the first device;

a subcarrier spacing that is in a correspondence with the carrier frequency for communication of the first device;

a largest value of subcarrier spacings that are in a correspondence with the carrier frequency for communication of the first device;

a smallest value of the subcarrier spacings that are in a correspondence with the carrier frequency for communication of the first device;

a subcarrier spacing that is predefined as a reference subcarrier spacing; and a subcarrier spacing that is configured as a reference subcarrier spacing.

Aspect 9. A communication method, comprising:

sending, by a second device, first configuration information on a second frequency domain resource, wherein the first configuration information is used to indicate a resource for a first device to send a first uplink reference signal on a first frequency domain resource; the first frequency domain resource is not used for transmitting uplink data and/or uplink control information; the first uplink reference signal is used for uplink channel sounding; the first frequency domain resource is further used for the first device to receive a third downlink reference signal; and a beam for the first device to send the first uplink reference signal on a first antenna port is also a beam for the first device to receive the third uplink reference signal; and receiving, by the second device, the first uplink reference signal.

Aspect 10. The method according to Aspects 9, wherein the first configuration information is further used to instruct the first device to send a third uplink reference signal on a third frequency domain resource, wherein the third uplink reference signal is used for uplink channel sounding; and the method further comprises:

receiving, by the second device, uplink control information and/or uplink data transmitted by the first device on a time domain resource between the first uplink reference signal and the third uplink reference signal, wherein the third uplink reference signal is the 1st uplink reference signal used for uplink channel sounding following the first uplink reference signal, wherein a time interval between the first uplink reference signal and the third uplink reference signal is not less than a threshold, or the first configuration information is further used to indicate a resource for the third uplink reference signal, and the first configuration information is one piece of downlink control information (downlink control information, DCI) or one MAC CE message, or a first resource for sending the first uplink reference signal and a third resource for sending the third uplink reference signal belong to one uplink reference signal resource set or one uplink reference signal resource configuration.

Aspect 11. The method according to Aspect 10, wherein the threshold meets at least one of the following:

the threshold is not less than twice a radio frequency retuning time;

the threshold is not less than a sum of twice the radio frequency retuning time and a length of k time units, wherein k is a number not less than 0, and the time unit is a slot or a symbol; and the threshold is not less than a sum of twice the radio frequency retuning time, the length of the k time units, and a preset offset, wherein the offset is less than a length of one symbol.

Aspect 12. The method according to Aspect 10 or 11, wherein the first frequency domain resource is also the third frequency domain resource.

Aspect 13. The method according to any one of Aspects 9 to 12, wherein the method further comprises:

receiving, by the second device, information reported by the first device for indicating a radio frequency retuning time of the first device, wherein the radio frequency retuning time reported by the first device is not greater than a maximum radio frequency retuning time, and the maximum radio frequency retuning time is determined by the first device based on a carrier frequency for communication of the first device or a reference subcarrier spacing for communication of the first device.

Aspect 14. The method according to Aspect 13, wherein the information indicating the radio frequency retuning time of the first device comprises:

an index of the radio frequency retuning time of the first device; or an index indicating a quantity of symbols corresponding to the radio frequency retuning time of the first device, wherein a subcarrier spacing corresponding to the symbols is the reference subcarrier spacing.

Aspect 15. The method according to Aspect 13 or 14, wherein a quantity of bits occupied by the information indicating the radio frequency retuning time of the first device is determined by the maximum radio frequency retuning time.

Aspect 16. A communications device, comprising:

an input port, configured to receive first configuration information on a second frequency domain resource, wherein the first configuration information is used to indicate a resource for the first device to send a first uplink reference signal on a first frequency domain resource; the first frequency domain resource is not used for transmitting uplink data and/or uplink control information; the first uplink reference signal is used for uplink channel sounding; and the first frequency domain resource is further used for the first device to receive a third downlink reference signal;

a processor, configured to determine that a beam for sending the first uplink reference signal on a first antenna port is also a beam for receiving the third downlink reference signal; and a transmit port, configured to the first uplink reference signal on the first antenna port.

Aspect 17. The device according to Aspect 16, wherein the first configuration information is further used to instruct the first device to send a third uplink reference signal on a third frequency domain resource, wherein the third uplink reference signal is used for uplink channel sounding; and the processor is further configured to: determine that a time interval between the first uplink reference signal and the third uplink reference signal is not less than a threshold, or determine that the first configuration information is further used to indicate a resource for the third uplink reference signal, and that the first configuration information is one piece of DCI or one MAC CE message, or determine that a first resource for sending the first uplink reference signal and a third resource for sending the third uplink reference signal belong to one uplink reference signal resource set or one uplink reference signal resource configuration; and the transmit port is further configured to transmit uplink control information and/or uplink data on a time domain resource between the first uplink reference signal and the third uplink reference signal, wherein the third uplink reference signal is the 1st uplink reference signal used for uplink channel sounding following the first uplink reference signal.

Aspect 18. The device according to Aspect 17, wherein the threshold meets at least one of the following:

the threshold is not less than twice a radio frequency retuning time;

the threshold is not less than a sum of twice the radio frequency retuning time and a length of k time units, wherein k is a number not less than 0, and the time unit is a slot or a symbol; and the threshold is not less than a sum of twice the radio frequency retuning time, the length of the k time units, and a preset offset, wherein the offset is less than a length of one symbol.

Aspect 19. The device according to Aspect 17 or 18, wherein the first frequency domain resource is also the third frequency domain resource.

Aspect 20. The device according to any one of Aspects 16 to 19, wherein the processor is further configured to:

determine a maximum radio frequency retuning time based on a carrier frequency for communication of the first device or a reference subcarrier spacing for communication of the first device; and the transmit port is further configured to report information indicating the radio frequency retuning time of the first device, wherein the radio frequency retuning time reported by the first device is not greater than the maximum radio frequency retuning time.

Aspect 21. The device according to Aspect 20, wherein the information indicating the radio frequency retuning time of the first device comprises:

an index of the radio frequency retuning time of the first device; or an index indicating a quantity of symbols corresponding to the radio frequency retuning time of the first device, wherein a subcarrier spacing corresponding to the symbols is the reference subcarrier spacing.

Aspect 22. The device according to Aspect 20 or 21, wherein a quantity of bits occupied by the information indicating the radio frequency retuning time of the first device is determined by the maximum radio frequency retuning time.

Aspect 23. The device according to any one of Aspects 20 to 22, wherein the reference subcarrier spacing is any one of the following:

one of subcarrier spacings of frequency domain resources configured for communication of the first device;

a largest value of all subcarrier spacings of the frequency domain resources configured for communication of the first device;

a smallest value of all subcarrier spacings of the frequency domain resources configured for communication of the first device;

a subcarrier spacing that is in a correspondence with the carrier frequency for communication of the first device;

a largest value of subcarrier spacings that are in a correspondence with the carrier frequency for communication of the first device;

a smallest value of the subcarrier spacings that are in a correspondence with the carrier frequency for communication of the first device;

a subcarrier spacing that is predefined as a reference subcarrier spacing; and a subcarrier spacing that is configured as a reference subcarrier spacing.

Aspect 24. A communications device, comprising:

a transmit port, configured to send first configuration information on a second frequency domain resource, wherein the first configuration information is used to indicate a first resource for a first device to send a first uplink reference signal on a first frequency domain resource and a second resource for the first device to send a second uplink reference signal on the second frequency domain resource; the first frequency domain resource is not used for transmitting uplink data and/or uplink control information; the first uplink reference signal is used for uplink channel sounding, and the second uplink reference signal is used for uplink channel sounding; and a beam for the first device to send the first uplink reference signal on a first antenna port is also a beam for the first device to send the second uplink reference signal on a second antenna port; and an input port, configured to receive the first uplink reference signal, wherein the receiving is based on a quasi co-location relationship between the first antenna port and the second antenna port.

Aspect 25. The device according to Aspect 24, wherein that a beam for the first device to send the first uplink reference signal on a first antenna port is also a beam for the first device to send the second uplink reference signal on a second antenna port comprises any one of the following:

the first configuration information is carried in one piece of downlink control information (downlink control information, DCI);

the first configuration information is carried in one MAC CE message; and the first resource for sending the first uplink reference signal on the first frequency domain resource and the second resource for sending the second uplink reference signal on the second frequency domain resource belong to one uplink reference signal resource set or one uplink reference signal resource configuration.

Aspect 26. The device according to Aspect 24 or 25, wherein the first frequency domain resource and the second frequency domain resource meet at least one of the following conditions:

the first frequency domain resource and the second frequency domain resource have a same subcarrier spacing;

the first frequency domain resource and the second frequency domain resource have a same cyclic prefix;

the first frequency domain resource and the second frequency domain resource have a same timing advance;

a frequency domain gap between the first frequency domain resource and the second frequency domain resource is less than a threshold;

the first frequency domain resource and the second frequency domain resource are within one frequency domain range; and the first frequency domain resource and the second frequency domain resource are configured to belong to one uplink reference signal resource set or one uplink reference signal resource configuration.

Aspect 27. The device according to any one of Aspects 24 to 26, wherein the first frequency domain resource is a first component carrier, and the second frequency domain resource is a second component carrier.

Aspect 28. The device according to any one of Aspects 24 to 26, wherein the first frequency domain resource is a first bandwidth part, and the second frequency domain resource is a second bandwidth part.

Aspect 29. A communications device, comprising:

a transmit port, configured to send first configuration information on a second frequency domain resource, wherein the first configuration information is used to indicate a resource for a first device to send a first uplink reference signal on a first frequency domain resource; the first frequency domain resource is not used for transmitting uplink data and/or uplink control information; the first uplink reference signal is used for uplink channel sounding; the first frequency domain resource is further used for the first device to receive a third downlink reference signal; and a beam for the first device to send the first uplink reference signal on a first antenna port is also a beam for the first device to receive the third uplink reference signal; and an input port, configured to receive the first uplink reference signal.

Aspect 30. The device according to any one of Aspects 24 to 29, wherein the first configuration information is further used to instruct the first device to send a third uplink reference signal on a third frequency domain resource, wherein the third uplink reference signal is used for uplink channel sounding; and the input port is further configured to:

receive uplink control information and/or uplink data transmitted by the first device on a time domain resource between the first uplink reference signal and the third uplink reference signal, wherein the third uplink reference signal is the 1st uplink reference signal used for uplink channel sounding following the first uplink reference signal, wherein a time interval between the first uplink reference signal and the third uplink reference signal is not less than a threshold, or the first configuration information is further used to indicate a resource for the third uplink reference signal, and the first configuration information is one piece of downlink control information (downlink control information, DCI) or one MAC CE message, or a first resource for sending the first uplink reference signal and a third resource for sending the third uplink reference signal belong to one uplink reference signal resource set or one uplink reference signal resource configuration.

Aspect 31. The device according to Aspect 30, wherein the threshold meets at least one of the following:

the threshold is not less than twice a radio frequency retuning time;

the threshold is not less than a sum of twice the radio frequency retuning time and a length of k time units, wherein k is a number not less than 0, and the time unit is a slot or a symbol; and the threshold is not less than a sum of twice the radio frequency retuning time, the length of the k time units, and a preset offset, wherein the offset is less than a length of one symbol.

Aspect 32. The method according to Aspect 30 or 31, wherein the first frequency domain resource is also the third frequency domain resource.

Aspect 33. The device according to any one of Aspects 24 to 32, wherein the input port is further configured to:

receive information reported by the first device for indicating a radio frequency retuning time of the first device, wherein the radio frequency retuning time reported by the first device is not greater than a maximum radio frequency retuning time, and the maximum radio frequency retuning time is determined by the first device based on a carrier frequency for communication of the first device or a reference subcarrier spacing for communication of the first device.

Aspect 34. The device according to Aspect 33, wherein the information indicating the radio frequency retuning time of the first device comprises:

an index of the radio frequency retuning time of the first device; or an index indicating a quantity of symbols corresponding to the radio frequency retuning time of the first device, wherein a subcarrier spacing corresponding to the symbols is the reference subcarrier spacing.

Aspect 35. The device according to Aspect 33 or 34, wherein a quantity of bits occupied by the information indicating the radio frequency retuning time of the first device is determined by the maximum radio frequency retuning time.

Aspect 36. A computer storage medium, wherein the computer storage medium stores a computer executable instruction, and when invoked by a computer, the computer executable instruction causes the computer to perform the method according to any one of Aspects 1 to 15.

Aspect 37. A communications device, wherein the communications device is configured to perform the method according to any one of Aspects 1 to 15.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, through a coaxial cable, an optical fiber, or a digital subscriber line (DSL)) or wireless (for example, through infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A communication method, comprising:
    receiving, by a first device, first configuration information on a second frequency domain resource, wherein the first configuration information indicates a first resource for the first device to send a first uplink reference signal on a first frequency domain resource and indicates a second resource for the first device to send a second uplink reference signal on the second frequency domain resource, wherein the first frequency domain resource is not used for transmitting uplink data and/or uplink control information, wherein the first uplink reference signal is used for uplink channel sounding, and wherein the second uplink reference signal is used for uplink channel sounding;
    determining, by the first device based on the first configuration information, whether a beam for sending the first uplink reference signal on a first antenna port is also a beam for sending the second uplink reference signal on a second antenna port;
    in response to determining that the beam for sending the first uplink reference signal on the first antenna port is also the beam for sending the second uplink reference signal on the second antenna port, determining, by the first device, beam information of the first antenna port for the first uplink reference signal based on beam information of the second antenna port for the second uplink reference signal, wherein the beam information of the second antenna port for the second uplink reference signal is index information that corresponds to a resource identity configured for the first device; and
    sending, by the first device, the first uplink reference signal on the first antenna port based on the beam information of the first antenna port.

2. The method according to claim 1, wherein the first configuration information is carried in one piece of downlink control information (DCI), and the determining, by the first device based on the first configuration information, whether the beam for sending the first uplink reference signal on the first antenna port is also the beam for sending the second uplink reference signal on the second antenna port comprises:
    determining, by the first device, whether the one piece of DCI instructs the first device to send the first uplink reference signal on the first frequency domain resource and instructs the first device to send the second uplink reference signal on the second frequency domain resource, so as to determine whether the beam for sending the first uplink reference signal on the first antenna port is also the beam for sending the second uplink reference signal on the second antenna port.

3. The method according to claim 1, wherein the determining, by the first device based on the first configuration information, whether the beam for sending the first uplink reference signal on the first antenna port is also the beam for sending the second uplink reference signal on the second antenna port comprises:
    determining, by the first device, whether the first resource for the first device to send the first uplink reference signal on the first frequency domain resource and the second resource for the first device to send the second uplink reference signal on the second frequency domain resource belong to one uplink reference signal resource set or belong to one uplink reference signal resource configuration, so as to determine whether the beam for sending the first uplink reference signal on the first antenna port is also the beam for sending the second uplink reference signal on the second antenna port.

4. The method according to claim 1, wherein the determining, by the first device based on the first configuration information, whether the beam for sending the first uplink reference signal on the first antenna port is also the beam for sending the second uplink reference signal on the second antenna port is based on at least one of the following conditions:
    the first frequency domain resource and the second frequency domain resource having a same subcarrier spacing;
    the first frequency domain resource and the second frequency domain resource having a same cyclic prefix;
    the first frequency domain resource and the second frequency domain resource having a same timing advance;
    a frequency domain gap between the first frequency domain resource and the second frequency domain resource being less than a threshold;
    the first frequency domain resource and the second frequency domain resource being within one frequency domain range; or
    the first frequency domain resource and the second frequency domain resource being configured to belong to one uplink reference signal resource set or one uplink reference signal resource configuration.

5. The method according to claim 1, wherein the first uplink reference signal is in a correspondence with the second uplink reference signal.

6. The method according to claim 1, wherein the first frequency domain resource is a first component carrier, and the second frequency domain resource is a second component carrier.

7. The method according to claim 1, wherein the first frequency domain resource is a first bandwidth part, and the second frequency domain resource is a second bandwidth part.

8. A communication method, comprising:
sending, by a second device, first configuration information on a second frequency domain resource to a first device, wherein the first configuration information indicates a first resource for the first device to send a first uplink reference signal on a first frequency domain resource and indicates a second resource for the first device to send a second uplink reference signal on the second frequency domain resource, wherein the first frequency domain resource is not used for transmitting uplink data and/or uplink control information, wherein the first uplink reference signal is used for uplink channel sounding, wherein the second uplink reference signal is used for uplink channel sounding, wherein a beam for the first device to send the first uplink reference signal on a first antenna port is also a beam for the first device to send the second uplink reference signal on a second antenna port, wherein beam information of the first antenna port for the first uplink reference signal is based on beam information of the second antenna port for the second uplink reference signal, and wherein the beam information of the second antenna port for the second uplink reference signal is index information that corresponds to a resource identity configured for the first device; and
receiving, by the second device, the first uplink reference signal from the first device on the first antenna port based on the beam information of the first antenna port.

9. The method according to claim 8, wherein that the beam for the first device to send the first uplink reference signal on the first antenna port is also the beam for the first device to send the second uplink reference signal on the second antenna port is based on at least one of the following conditions:
the first configuration information being carried in one piece of downlink control information (DCI);
the first configuration information being carried in one media access control (MAC) control element (CE) message; or
the first resource for sending the first uplink reference signal on the first frequency domain resource and the second resource for sending the second uplink reference signal on the second frequency domain resource belonging to one uplink reference signal resource set or belonging to one uplink reference signal resource configuration.

10. The method according to claim 8, wherein that the beam for the first device to send the first uplink reference signal on the first antenna port is also the beam for the first device to send the second uplink reference signal on the second antenna port is based on at least one of the following conditions:
the first frequency domain resource and the second frequency domain resource having a same subcarrier spacing;
the first frequency domain resource and the second frequency domain resource having a same cyclic prefix;
the first frequency domain resource and the second frequency domain resource having a same timing advance;
a frequency domain gap between the first frequency domain resource and the second frequency domain resource being less than a threshold;
the first frequency domain resource and the second frequency domain resource being within one frequency domain range; or
the first frequency domain resource and the second frequency domain resource being configured to belong to one uplink reference signal resource set or one uplink reference signal resource configuration.

11. The method according to claim 8, wherein the first frequency domain resource is a first component carrier, and the second frequency domain resource is a second component carrier.

12. The method according to claim 8, wherein the first frequency domain resource is a first bandwidth part, and the second frequency domain resource is a second bandwidth part.

13. A device, comprising:
an input port, configured to receive first configuration information on a second frequency domain resource, wherein the first configuration information indicates a first resource for the device to send a first uplink reference signal on a first frequency domain resource and indicates a second resource for the device to send a second uplink reference signal on the second frequency domain resource, wherein the first frequency domain resource is not used for transmitting uplink data and/or uplink control information, wherein the first uplink reference signal is used for uplink channel sounding, and wherein the second uplink reference signal is used for uplink channel sounding;
a processor, configured to:
determine, based on the first configuration information, whether a beam for sending the first uplink reference signal on a first antenna port is also a beam for sending the second uplink reference signal on a second antenna port; and
in response to determining that the beam for sending the first uplink reference signal on the first antenna port is also the beam for sending the second uplink reference signal on the second antenna port, determine, based on beam information of the second antenna port for the second uplink reference signal, beam information of the first antenna port for the first uplink reference signal, wherein the beam information of the second antenna port for the second uplink reference signal is index information that corresponds to a resource identity configured for the device; and
a transmit port, configured to send the first uplink reference signal on the first antenna port based on the beam information of the first antenna port, wherein the sending is based on a quasi co-location relationship between the first antenna port and the second antenna port.

14. The device according to claim 13, wherein the first configuration information is carried in one piece of downlink control information (DCI), and the processor is further configured to:
determine whether the one piece of DCI instructs the device to send the first uplink reference signal on the first frequency domain resource and instructs the device to send the second uplink reference signal on the second frequency domain resource, so as to determine whether the beam for sending the first uplink reference signal on the first antenna port is also the beam for sending the second uplink reference signal on the second antenna port.

15. The device according to claim 13, wherein the processor is further configured to:

determine whether the first resource for the device to send the first uplink reference signal on the first frequency domain resource and the second resource for the device to send the second uplink reference signal on the second frequency domain resource belong to one uplink reference signal resource set or belong to one uplink reference signal resource configuration, so as to determine whether the beam for sending the first uplink reference signal on the first antenna port is also the beam for sending the second uplink reference signal on the second antenna port.

16. The device according to claim 13, wherein the determining, based on the first configuration information, whether the beam for sending the first uplink reference signal on the first antenna port is also the beam for sending the second uplink reference signal on the second antenna port is based on at least one of the following conditions:

the first frequency domain resource and the second frequency domain resource having a same subcarrier spacing;

the first frequency domain resource and the second frequency domain resource having a same cyclic prefix;

the first frequency domain resource and the second frequency domain resource having a same timing advance;

a frequency domain gap between the first frequency domain resource and the second frequency domain resource being less than a threshold;

the first frequency domain resource and the second frequency domain resource being within one frequency domain range; or the first frequency domain resource and the second frequency domain resource being configured to belong to one uplink reference signal resource set or one uplink reference signal resource configuration.

17. The device according to claim 13, wherein the first uplink reference signal is in a correspondence with the second uplink reference signal.

18. The device according to claim 13, wherein the first frequency domain resource is a first component carrier, and the second frequency domain resource is a second component carrier.

19. The device according to claim 13, wherein the first frequency domain resource is a first bandwidth part, and the second frequency domain resource is a second bandwidth part.

* * * * *